(12) United States Patent
Miyamoto et al.

(10) Patent No.: US 6,241,610 B1
(45) Date of Patent: Jun. 5, 2001

(54) THREE-DIMENSIONAL IMAGE PROCESSING SYSTEM HAVING DYNAMICALLY CHANGING CHARACTER POLYGON NUMBER

(75) Inventors: Shigeru Miyamoto; Yasunari Nishida; Takumi Kawagoe; Yoshiaki Koizumi, all of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 08/858,341

(22) Filed: May 19, 1997

Related U.S. Application Data

(63) Continuation-in-part of application No. PCT/JP96/02726, filed on Sep. 20, 1996, and a continuation-in-part of application No. 08/719,019, filed on Sep. 24, 1996, now Pat. No. 6,001,015.
(60) Provisional application No. 60/043,866, filed on Apr. 14, 1997.

(51) Int. Cl.⁷ ........................................................ A63F 9/22

(52) U.S. Cl. ................................ 463/33; 463/31; 463/32

(58) Field of Search .................................. 463/30, 31, 32, 463/33, 34, 36; 345/418, 428

(56) References Cited

U.S. PATENT DOCUMENTS

| D. 316,879 | 5/1991 | Shulman et al. . |
| D. 317,946 | 7/1991 | Tse . |
| D. 357,712 | 4/1995 | Wu . |
| D. 363,092 | 10/1995 | Hung . |
| D. 375,326 | 11/1996 | Yokoi et al. . |
| 3,729,129 | 4/1973 | Fletcher et al. . |
| 4,161,726 | 7/1979 | Burson et al. . |

(List continued on next page.)

FOREIGN PATENT DOCUMENTS

| 32 04 428 | 8/1983 | (DE) . |
| 40 18 052 | 12/1990 | (DE) . |

(List continued on next page.)

OTHER PUBLICATIONS

"Analog Joystick Interface Emulation Using a Digital Counter", IBM technical Disclosure Bulletin, vol. 37, No. 08, Aug. 1994, pp. 73–74.

(List continued on next page.)

Primary Examiner—Jessica J. Harrison
(74) Attorney, Agent, or Firm—Nixon & Vanderhye PLC

(57) ABSTRACT

A video game system includes a game cartridge which is pluggably attached to a main console having a main processor, a coprocessor, and player controllers. A multi-functional peripheral processing subsystem external to the game microprocessor and coprocessor is described which executes commands for handling player controller input/output to thereby lessen the processing burden on the graphics processing subsystem. A player controlled character may be controlled in a multitude of different ways utilizing the combination of the joystick and/or cross-switch and/or control keys. The controlled character's pace may be varied between walking by slight controller joystick movement or running through a greater angular displacement of the joystick, while at the same time controlling the direction of the character's movement over 360 degrees in the three-dimensional world. The number of polygons utilized to display a player-controlled character is modified depending upon the speed of movement of the character, whereby the number of polygons is reduced at higher speed. At low level speeds, the character is drawn with a predetermined number of polygons and at higher level speeds the character is drawn with a reduced number of polygons, except that the polygons used for drawing the face remains the same as at the first level speed. In this fashion, the character is simulated in a manner designed to appear to be most realistic to the user, who is more likely to focus on the character face, rather than the body during animated character motion.

13 Claims, 16 Drawing Sheets

U.S. PATENT DOCUMENTS

| | | |
|---|---|---|
| 4,359,222 | 11/1982 | Smith, III et al. . |
| 4,469,330 | 9/1984 | Asher . |
| 4,552,360 | 11/1985 | Bromley et al. . |
| 4,587,510 | 5/1986 | Kim . |
| 4,659,313 | 4/1987 | Kuster et al. . |
| 4,685,678 | 8/1987 | Frederiksen . |
| 4,748,441 | 5/1988 | Brzezinski . |
| 4,868,780 | 9/1989 | Stern . |
| 4,887,230 | 12/1989 | Noguchi et al. . |
| 4,887,966 | 12/1989 | Gellerman . |
| 4,916,440 | 4/1990 | Faeser et al. . |
| 4,924,216 | 5/1990 | Leung . |
| 4,933,670 | 6/1990 | Wislocki . |
| 4,974,192 | 11/1990 | Face et al. . |
| 4,976,429 | 12/1990 | Nagel . |
| 5,001,632 | 3/1991 | Hall-Tipping . |
| 5,012,230 | 4/1991 | Yasuda . |
| 5,046,739 | 9/1991 | Reichow . |
| 5,160,918 | 11/1992 | Saposnik et al. . |
| 5,203,563 | 4/1993 | Loper, III . |
| 5,207,426 | 5/1993 | Inoue et al. . |
| 5,213,327 | 5/1993 | Kitaue . |
| 5,237,311 | 8/1993 | Mailey et al. . |
| 5,245,320 | 9/1993 | Bouton . |
| 5,259,626 | 11/1993 | Ho . |
| 5,286,024 | 2/1994 | Winblad . |
| 5,290,034 | 3/1994 | Hineman . |
| 5,329,276 | 7/1994 | Hirabayashi . |
| 5,390,937 | 2/1995 | Sakaguchi et al. . |
| 5,394,168 | 2/1995 | Smith, III et al. . |
| 5,421,590 | 6/1995 | Robbins . |
| 5,436,640 | 7/1995 | Reeves . |
| 5,451,053 | 9/1995 | Garrido . |
| 5,459,487 | 10/1995 | Bouton . |
| 5,473,325 | 12/1995 | McAlindon . |
| 5,515,044 | 5/1996 | Glatt . |
| 5,551,693 | 9/1996 | Goto et al. . |
| 5,551,701 | 9/1996 | Bouton et al. . |
| 5,555,354 * | 9/1996 | Strasnick et al. ............... 345/427 |
| 5,558,329 | 9/1996 | Liu . |
| 5,563,629 | 10/1996 | Caprara . |
| 5,589,854 | 12/1996 | Tsai . |
| 5,593,350 | 1/1997 | Bouton et al. . |
| 5,607,157 | 3/1997 | Nagashima . |
| 5,615,083 | 3/1997 | Burnett . |
| 5,624,117 | 4/1997 | Ohkubo et al. . |
| 5,632,680 | 5/1997 | Chung . |
| 5,640,177 | 6/1997 | Hsu . |
| 5,643,087 | 7/1997 | Marcus et al. . |
| 5,649,862 | 7/1997 | Sakaguchi et al. . |
| 5,653,637 | 8/1997 | Tai . |
| 5,663,747 | 9/1997 | Shulman . |
| 5,684,512 | 11/1997 | Schoch et al. . |
| 5,704,837 | 1/1998 | Iwasaki et al. . |
| 5,706,029 | 1/1998 | Tai . |
| 5,714,981 | 2/1998 | Scott-Jackson et al. . |
| 5,734,373 | 3/1998 | Rosenberg et al. . |
| 5,755,620 * | 5/1998 | Yamamoto et al. ............... 463/34 |
| 5,766,079 * | 6/1998 | Kataoka et al. ............... 463/36 |
| 5,786,807 | 7/1998 | Couch et al. . |
| 5,793,356 | 8/1998 | Svancarek et al. . |
| B1 4,870,389 | 6/1997 | Ishiwata et al. . |

FOREIGN PATENT DOCUMENTS

| | | |
|---|---|---|
| 268 419 | 5/1988 | (EP) . |
| 431 723 | 6/1991 | (EP) . |
| 0 470 615 | 2/1992 | (EP) . |
| 553 532 | 8/1993 | (EP) . |
| 685 246 | 12/1995 | (EP) . |
| 724 220 | 7/1996 | (EP) . |
| 2234575 | 2/1991 | (GB) . |
| 2 244 546 | 12/1991 | (GB) . |
| 2 263 802 | 8/1993 | (GB) . |
| 50-22475 | 3/1975 | (JP) . |
| 57-18236 | 1/1982 | (JP) . |
| 57-2084 | 1/1982 | (JP) . |
| 57-136217 | 8/1982 | (JP) . |
| 59-40258 | 3/1984 | (JP) . |
| 59-121500 | 7/1984 | (JP) . |
| 61-16641 | 1/1986 | (JP) . |
| 61-198286 | 9/1986 | (JP) . |
| 61-185138 | 11/1986 | (JP) . |
| 2-41342 | 3/1990 | (JP) . |
| 2-68404 | 5/1990 | (JP) . |
| 3-16620 | 1/1991 | (JP) . |
| 3-248215 | 11/1991 | (JP) . |
| 4-26432 | 1/1992 | (JP) . |
| 4-20134 | 2/1992 | (JP) . |
| 4-42029 | 2/1992 | (JP) . |
| 4-104893 | 9/1992 | (JP) . |
| 4-291468 | 10/1992 | (JP) . |
| 5-100759 | 4/1993 | (JP) . |
| 5-19925 | 5/1993 | (JP) . |
| 5-177057 | 7/1993 | (JP) . |
| 5-241502 | 9/1993 | (JP) . |
| 6-23148 | 2/1994 | (JP) . |
| 6-54962 | 3/1994 | (JP) . |
| 6-68238 | 3/1994 | (JP) . |
| 6-110602 | 4/1994 | (JP) . |
| 6-114683 | 4/1994 | (JP) . |
| 6-190145 | 7/1994 | (JP) . |
| 6-190147 | 7/1994 | (JP) . |
| 6-205010 | 7/1994 | (JP) . |
| 6-285259 | 10/1994 | (JP) . |
| 6-290277 | 10/1994 | (JP) . |
| 6-315095 | 11/1994 | (JP) . |
| 7-104930 | 4/1995 | (JP) . |
| 7-116343 | 5/1995 | (JP) . |
| 7-178242 | 7/1995 | (JP) . |
| 7-222865 | 8/1995 | (JP) . |
| 7-288006 | 10/1995 | (JP) . |
| 7-317230 | 12/1995 | (JP) . |
| 8-45392 | 2/1996 | (JP) . |
| 62-269221 | 11/1997 | (JP) . |
| WO 92/09347 | 6/1992 | (WO) . |
| WO 94/12999 | 6/1994 | (WO) . |
| WO97/17651 | 5/1997 | (WO) . |

OTHER PUBLICATIONS

Super Mario 64 Player's Guide, Nintendo of America, 1996.

Nintendo Power, "The Fun Machine" for Nintendo 64.

*Nintendo Power*, vol. 80, pp. 20–27, Jan. 1996.

Falcon Electronic Battlefield Series, Advertisement, Spectrum HoloByte, Alameda, California #F303IBM 208858. (Exhibited at 1992 CES).

*Nintendo Employee Shoshinkai Reports*, 14 pages, Nov. 24–26, 1995.

"Hardware Reset With Microcode Warning Period", *IBM Technical Disclosure Bulletin*, vol. 33, No. 11, Apr. 1991, pp. 105–106.

*3D Ballz Instruction Booklet*, Accolade, San Jose, California, #3050–00231 Rev. A.

6 Photographs of Sony PlayStation: 1) top case and compact disk; 2) hand controller; 3) internal circuit boards (top view); 4) internal circuit boards (top view); 5) compact disk reader (bottow view); and internal main circuit board (bottom view).

*Knuckles Chaotix Instruction Manual*, SEGA, Redwood City, California, #84503 (1995).
*Nintendo Power*, vol. 30, p. 22, PilotWings article.
*Nintendo Power*, vol. 31, p. 35, PilotWings article.
*Nintendo Power*, vol. 31, pp. 74–76, Pilot Wings article.
*Nintendo Power*, vol. 38, p. 25, PilotWings article.
*Nintendo Power*, vol. 46, PilotWings article.
*PilotWings Instruction Booklet*, Super Nintendo Entertainment System, SNS–PW–USA, copyright 1991.
*PilotWings, It's a Festival of Flight*, Top Secret Password Nintendo Player's Guide, pp. 82–83 and 160, copyright 1991.
*PilotWings, Soar with the Flight Club*, Super Nintendo Entertainment System Play's Guide, pp. 100–105, copyright 1991.
*SEGA Genesis 32X Instruction Manual*, SEGA, Redwood City California, #672–2116 (1994).
*SEGA Genesis Instruction Manual*, SEGA, Hayward, California,#3701–926–0–01 (1994).
*Sonic 2 the Hedgehog Instruction Manual*, SEGA, Hayward, California, #672–0944 3701–925–0–01 (1992).
Sony PlayStation Instruction Manual, and informational materials, Sony Computer Entertainment Inc. 1995.

* cited by examiner

| 1 BYTE | B | A | G | START | ↑ | ↓ | ← | → |
|---|---|---|---|---|---|---|---|---|
| 2 BYTE | JSRST | O | L | R | E | D | C | F |
| 3 BYTE | X ORDINATE ||||||||
| 4 BYTE | Y ORDINATE ||||||||

THREE-DIMENSIONAL IMAGE PROCESSING SYSTEM HAVING DYNAMICALLY CHANGING CHARACTER POLYGON NUMBER

This application is a continuation-in-part of application PCT/JP96/02726, filed on Sep. 20, 1996 and entitled "Three-Dimensional Image Processing Apparatus" (FNP-225) and is a continuation-in-part of U.S. application Ser. No. 08/719,019 now U.S. Pat. No. 6,001,015 (the '019 application), filed on Sep. 24, 1996 and entitled Operation Controlling Device and Video Processing System Used Therewith", each of which is incorporated herein by reference, and claims priority from provisional application 60/043,866 filed Apr. 14, 1997, now abandoned.

FIELD OF THE INVENTION

This invention relates to three-dimensional image processing systems. More particularly, this invention relates to three-dimensional image processing systems for video game machines or the like, which operate to display an object in three-dimensional space such that the object is moved in accordance with the direction and amount of inclination of an operating member, such as an analog joystick, of an operation controller device.

BACKGROUND AND SUMMARY OF THE INVENTION

The conventional video game machine has a cross-shaped key switch on a controller thereof so that the object displayed is moved by the operation of the cross key switch. Such a cross key switch permits only limited direction of movement control to be designated for the object. The speed of movement can not be designated with a conventional cross switch.

There also is a method for varying the moving speed of the object as a function of the length of the time period over which the cross key as stated above is being depressed. In such a method, acceleration or deceleration is controlled for the object at a constant acceleration rate or a constant deceleration rate by each constant depression time period. Although, in this method, the moving direction and the moving speed of the object can be controlled even by using a cross switch, there exists the disadvantage that the object moving speed is varied merely at a constant rate of acceleration or deceleration as determined by software based calculations, so that it is impossible to arbitrarily control the speed of movement. Furthermore, the speed is determined by the period of key depression time, which requires that the cross key has to be depressed for a certain period or longer, resulting in poor responsiveness.

Under such circumstances, the applicants' assignee has proposed in Japanese Provisional Utility Model Publication No. H2-41342, laid open to the public on Mar. 22, 1990, a cross switch having three contacts arranged in one direction on a cross key thereof so that the moving speed, besides the moving direction, is varied for the object by the utilization of changing the turning-on of contacts depending upon the d cross key expression amount.

In this prior art, however, the direction of movement is limited to four directions of upper, lower, left and right (and intermediate directions thereof), and the speed of movement is varied only between three stages of speed. That is, in this prior art there still exists significant limitations in controlling the moving direction and the moving speed.

Although there are already known game machines employing an analog joystick for a control lever of an aircraft, such an analog joystick is typically used for controlling the inclination of the aircraft, and wherein control is impossible for the moving direction or the moving speed.

It is therefore an object of the present invention to provide an image processing system which is high in responsiveness and capable of controlling the moving direction and the moving speed of a player controlled character (object operable object).

The present invention is directed to a three-dimensional image processing system including an image processing apparatus connected to a display to generate image data for displaying an object existing in a three-dimensional space on the display according to a stored program, and an operating device including an operating member having a base end rotatably supported and a free end operable by an operator, so that the image data is varied in accordance with movement of the operating member. The operating device includes inclination amount data output circuitry which detects an inclination amount of the operating member to output inclination amount data. The exemplary image processing apparatus includes direction determining hardware and software which determines a moving direction of the object in three-dimensional space based on the inclination amount data; moving amount determining hardware and software which determines a moving amount of the object within one display frame; position determining hardware and software which determines object position in the three-dimensional space in accordance with the moving direction and the moving amount; and an image data output circuitry which outputs image data for displaying the object on the display at a position controlled by the position determining hardware and software.

The operating device is, for example, an analog joystick, which includes a base end supported rotatably with a given angle range and a free end for being operated by an operator so that the operating member is inclined to arbitrary directions in accordance with operator operation. For example, an inclination amount data output circuitry such as an X counter and a Y counter detects the amount of inclination of the operating member to output inclination amount data.

The image processing apparatus includes a program storing memory, wherein the program storing memory is preferably an external storage device detachably attached to the image processing apparatus main body. Direction determining circuitry and moving amount determining circuitry comprised for example of a CPU under control of the stored program respectively determine moving direction of the object in the three-dimensional space and moving amount of the object to be moved in one display frame, based on the inclination amount data from the operating device.

Specifically, count values of an X counter and the Y counter are converted by normalizing into a UV coordinate frame. The CPU determines the inclination amount (L) and the inclination direction ($\tan^{-1}$) by the UV coordinate value (u, v). The direction determining circuitry is, for example, the CPU, which determines under program control the moving direction of the object based on the inclination direction ($\tan^{-1}$) thereof and the point of view (camera angle) at which the object is considered to be "photographed" in the three-dimensional space. The moving amount determining circuitry is, for example, the CPU, which determines under program control the moving amount of the object within the one display frame, i.e., the moving speed, based on the inclination amount (L) and the maximum speed (max-speed).

Therefore, the position determining circuitry determines the position of the object in three-dimensional space in dependence upon the moving direction and the moving amount. Consequently, the image data output circuitry outputs image data for display of the object at the position thus determined.

In accordance with the present invention, the operation of one operating device such as an analog joystick provides control of the moving direction and the moving amount (moving speed) of the object.

Another embodiment of the present invention relates to image processing apparatus which generate images using polygons. When a displayed character which is created by polygons moves at high speed, and when it is necessary to process an extremely large number of polygon operations within a specified time, serious problems may result. Under such circumstances, if the number of polygons to be processed exceeds the operation capacity of the image processing apparatus, the image processing apparatus may fail to timely process the image data. As a result, the displayed image may, for example, erroneously appear to be moving in slow motion.

The image processing apparatus of the present invention may be advantageously used when the increase in the number of polygons due to the elevation of the character moving speed or the like exceeds the operation capacity (hereinafter called limit detection). It is a feature of the image processing apparatus of the present invention that the number of polygons for generating a character is selectively decreased, e.g., when the limit is detected to avoid slow motion due to failure in processing. More particularly, according to the present application, when it is necessary or desirable to decrease the number of polygons, the number of polygons is decreased on a priority basis in the area where a rough image is more easily tolerated, such as the body of the character, and is not decreased to the extent possible in the area where a rough image is more noticeable, such as the face.

In accordance with this further embodiment, the number of polygons utilized to display a player-controlled character is modified depending upon the speed of movement of the character, whereby the number of polygons is reduced at higher speed. At low level speeds, the character is drawn with a predetermined number of polygons and at higher level speeds the character is drawn with a reduced number of polygons, except that the polygons used for drawing the face remains the same as at the first level speed. In this fashion, the character is simulated in a manner designed to appear to be most realistic to the user, who is more likely to focus on the character face, rather than the body during animated character motion. Thus, in the present application, since the number of polygons is decreased sequentially from the less noticeable area to the more noticeable area, depending on the moving speed of the character, processing failure and slow motion erroneous displays can be prevented without recognition of a rough image by the user.

The above and other objects, features, aspects, and advantage of the present invention will become more apparent from the ensuing detailed description of the present invention when taken in conjunction with the accompanying drawings.

BRIEF DESCRIPTION OF THE DRAWING

FIG. 10 is an illustrative view showing data of an analog joystick of the controller and respective buttons;

DETAILED DESCRIPTION OF THE DRAWINGS

Figure 1:
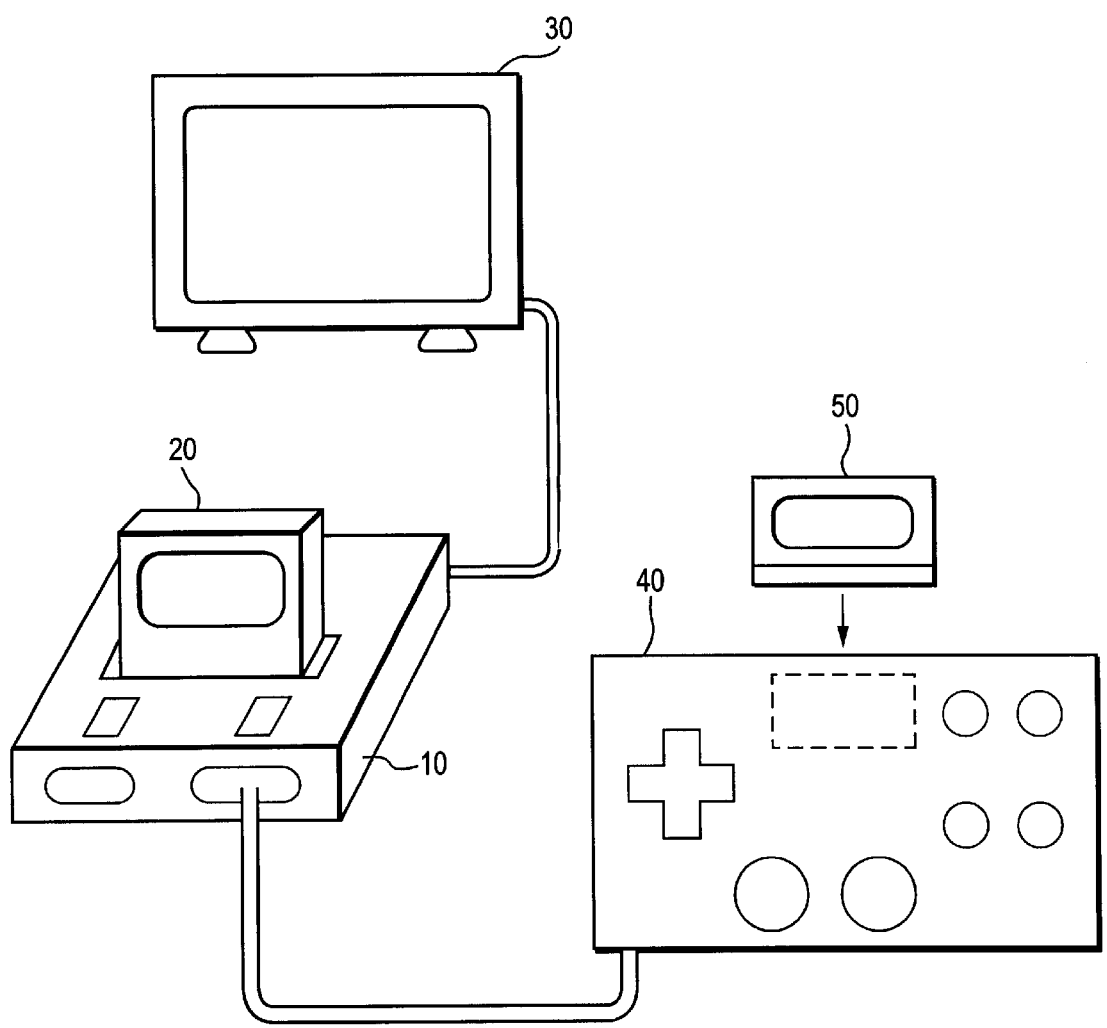
FIG. 1 is a schematic illustrative view showing one embodiment of the present invention.

Referring to FIG. 1, there is illustrated an external view showing an exemplary three-dimensional image processing system according to one embodiment of the present invention. The image processing system is, for example, a video game system, which includes an image processing apparatus main console 10, a ROM cartridge 20 (as one example of an external memory device), a television type monitor 30 (as one example of a display means) connected to the image processing apparatus main console 10, a schematically represented illustrative controller 40, and a RAM cartridge 50 (one example of an extension device detachably attached to the controller 40). The external memory device stores image data and program data for image processing for games, and audio data for music, sound effects, etc. A CD-ROM or a magnetic disc may alternatively be employed in place of the ROM cartridge. Where the image processing system of this exemplary embodiment is applied to a personal computer, an input device such as a keyboard or a mouse may be used as the operating mechanism.

Figure 2:
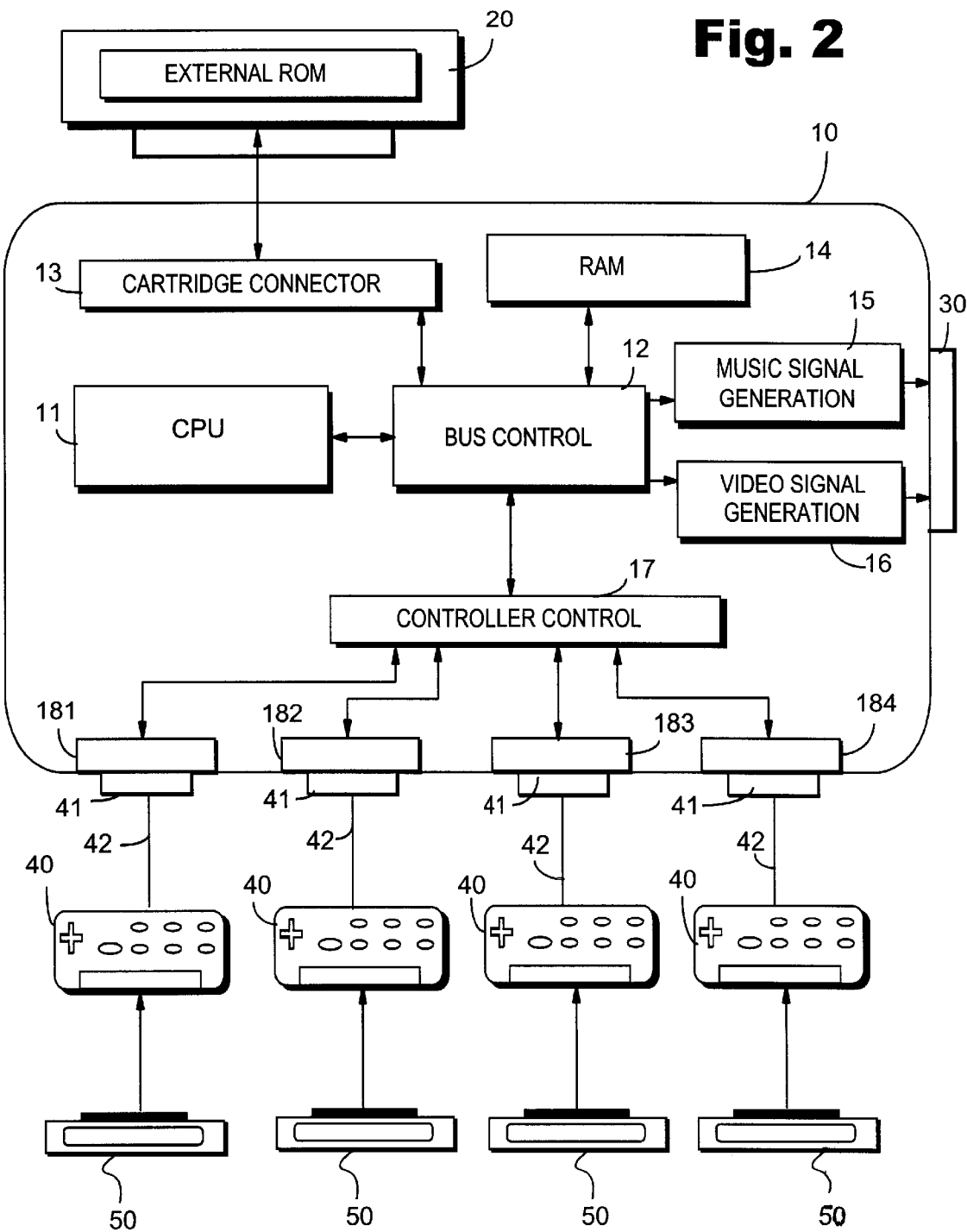
FIG. 2 is a block diagram showing in an illustrative image processing apparatus in the FIG. I embodiment.

FIG. 2 is a block diagram of an exemplary image processing system. The image processing apparatus 10 incorporates therein a central processor unit (hereinafter "CPU") 11 and a bus control circuit 12. The bus control circuit 12 is connected to a cartridge connector 13 for detachably attaching a ROM cartridge 20, and a RAM 14. The bus control circuit 12 is connected to an audio signal generating circuit 15 for outputting an audio signal processed by the CPU 11 and a video signal generating circuit 16 for outputting a video signal, and further to a controller control circuit 17 for serially transferring operating data from one or a plurality of controller(s) 40 and/or data from RAM cartridge(s) 50. The controller control circuit 17 is connected to controller connectors (hereinafter abbreviated as "connectors") 181–184 which are provided at a front console face of the image processing apparatus 10. A connection jack 41 is detachably connected to connector 181–184 and to the controllers 40 through a cable 42. Thus, the connection of the controller 40 to the connector 181–184 places the controller 40 into electric connection with the image processing apparatus 10, enabling transmission and reception of data therebetween.

More specifically, the bus control circuit 12 receives a command output as a parallel signal from CPU 11 via a bus and converts it to a serial signal for outputting a serial signal command to the controller control circuit 17, and converts serial signal data input from the controller control circuit 17 into a parallel signal for output to a bus. The data output through the bus is processed by CPU 11, and may be stored in RAM 14. RAM 14 is a memory for temporarily storing the data to be processed by CPU 11, wherein read-out and writing of data is possible through the bus control circuit 12.

The bus control circuit 12, included in the image processing apparatus 10 in FIG. 2, for example, includes a coprocessor RCP (Reality Co-Processor) which may be a RISC processor. As shown in the FIG. 3 exemplary embodiment the coprocessor RCP includes an control 121, a signal processor 122 and a display or drawing processor 123. Further details of the FIG. 3 circuitry are shown in the applicant's assignee's copending U.S. patent application Ser. No. 08/562,288 (the '288 application), filed on Nov. 22, 1995 and entitled "High Performance/Low Cost Video Game System With Multifunctional Peripheral Processing Subsystem", which application is incorporated herein by reference. As described in the above-identified incorporated '288 application, the bus control processing circuit (coprocessor 200 therein) may perform a wide range of graphics processing functions in addition to the controller related and other processing functions described herein. The bus control processing unit is a coprocessor which cooperates with CPU 11 to execute the video game/videographics program stored in the removable memory media. The controller 40 data which has been output to the bus control processing unit is appropriately processed, e.g., by the CPU 11, or is stored in RAM 14. Videographics processing within video processing device 10 may take place in accordance with above-identified copending application Ser. No. 08/562,288.

The I/O control 121 controls not only the transfer of data between the CPU 11 and the RAM 13, but also the flow of data between the signal processor 122 or the drawing processor 123 and the RAM 14 or the CPU 11. That is, the data from the CPU 11 is delivered to the RAM 14 via the I/O control 121, and further the data from the RAM 14 is supplied to the signal processor 122 and the drawing processor 123 for processing therein. The signal processor 122 and the drawing processor 123 respectively process music signal data and image signal data and store such data in RAM 14. The I/O control 121 then reads the music signal data and the image signal data out of the RAM 14 according to instructions executed by the CPU 11 to supply respective signals to a music signal generating circuit (D/A converter) 15 and an image signal generating circuit (D/A converter) 16. The music signal is supplied via a connector 195 to a speaker 31 included in a TV monitor 30. The image signal is supplied via a connector 196 to a display 32 included in the TV monitor 30.

Figure 3:
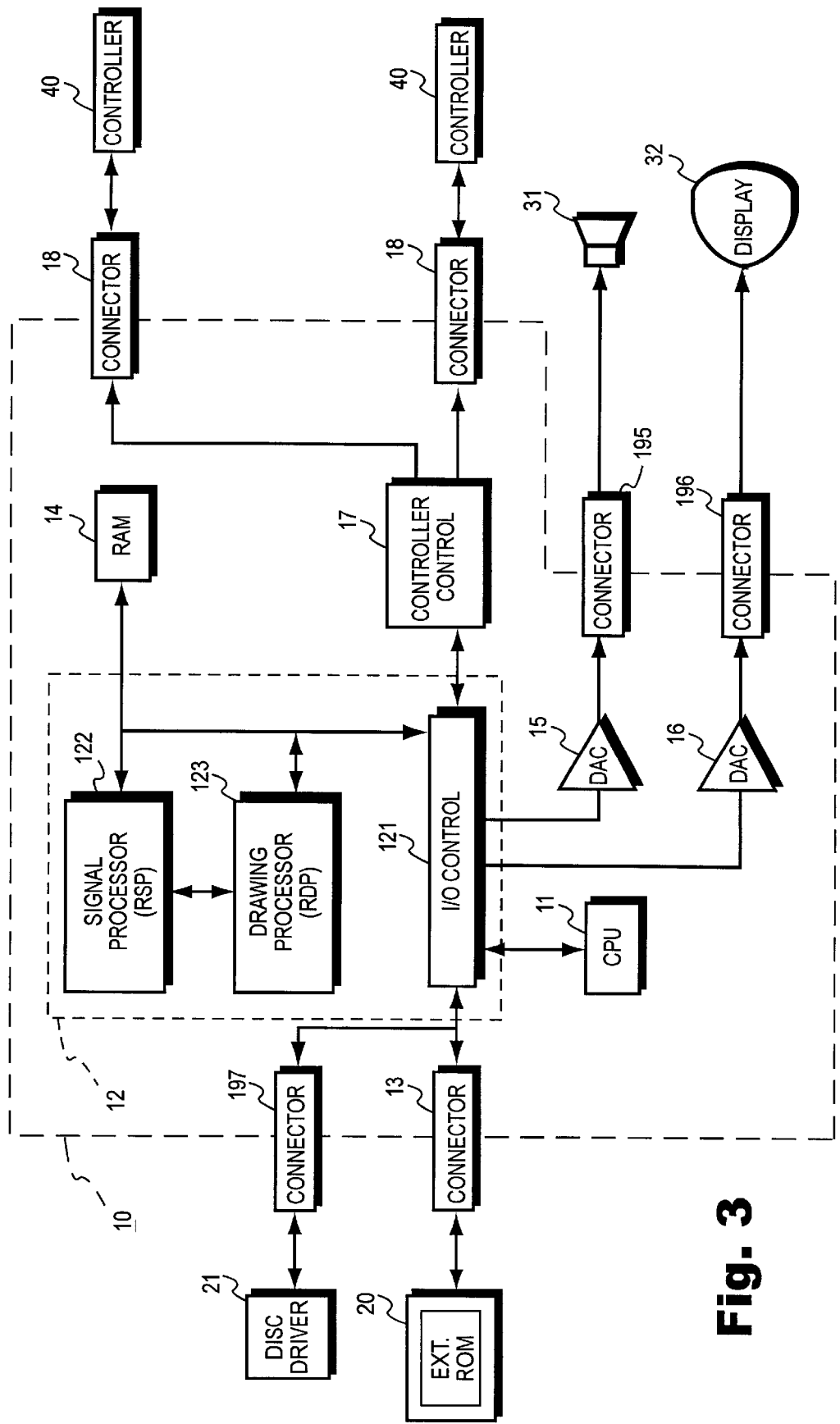
FIG. 3 is a block diagram showing in more detail an illustrative bus control circuit in the, FIG. 2 embodiment.

A disc driver 21 may be connected to the image processing apparatus 10 as shown in FIG. 3, in place of or together with the external ROM 20 wherein the disc driver can read out of or write to an optical disc or a magnetic disc. In this case, the disc driver 21 is connected to the RCP 12, i.e., the I/O control 121, through a connector 197.

Figure 4:
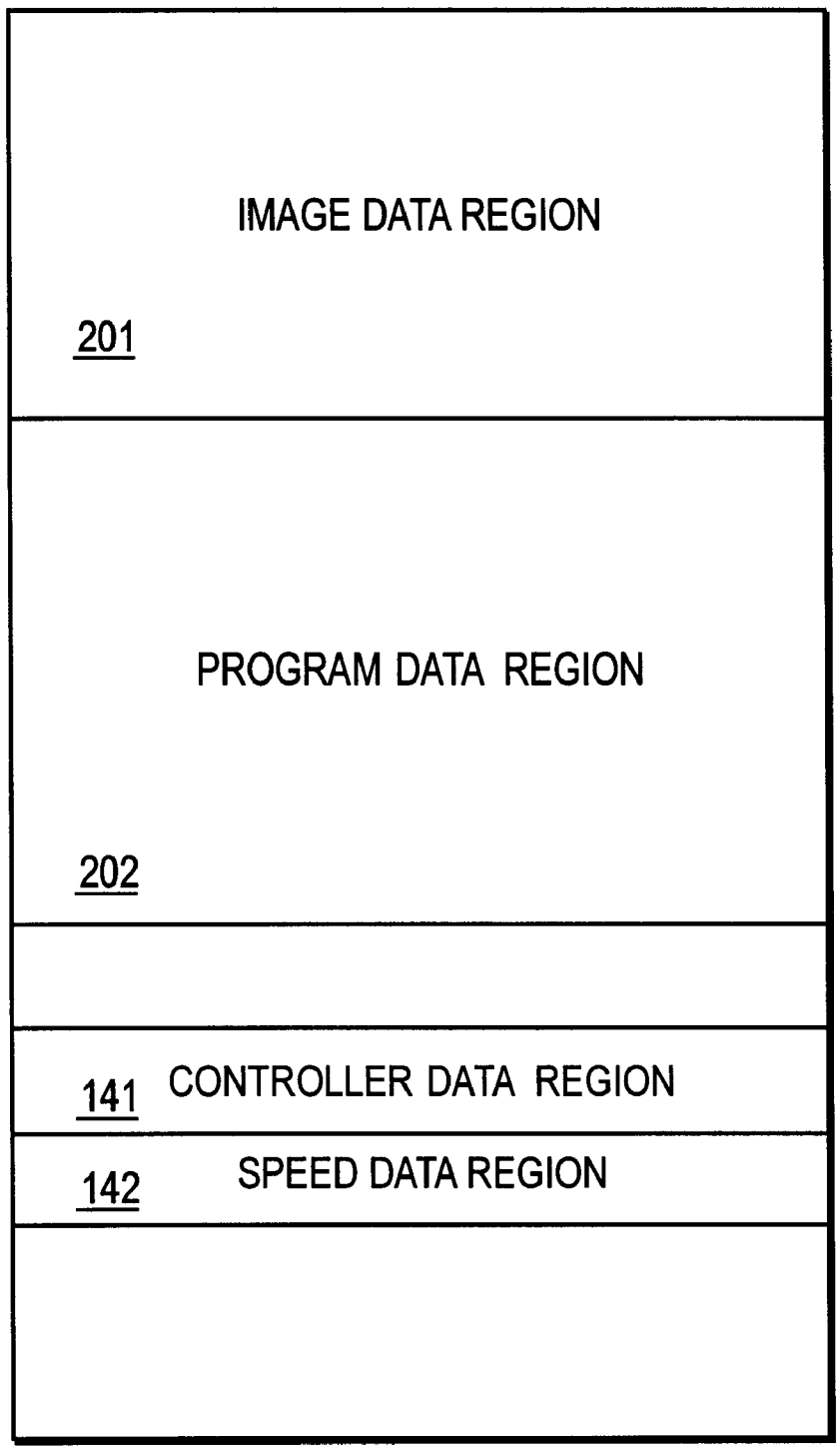
FIG. 4 is an illustrative view showing a memory map of a RAM in the FIG. 2 embodiment.

FIG. 4 is an illustrative diagram showing memory areas assigned to CPU 11 memory address space. The RAM address space is accessible by the CPU via the bus control circuit, i.e., the RCP, 12 and includes an image data region 201 for storing image data required to cause the image processing apparatus 10 to generate image signals for the game, and a program data region 202 for storing program data required for controlling predetermined CPU 11 operations. In the program data region 202, there are fixedly stored an image display program for performing image display processing based on image data 201, a time-measuring program for performing processing relating to the measurement of time, and a determination program for determining that the cartridge 20 and an extension device 50, hereinafter referred to, have a predetermined relationship. The RAM 14 includes further a region 141 for temporarily storing data representative of an operating state from a control panel or controller and a speed data region 142 for storing speed of object movement data (the amount of movement over which the object moves in one display frame).

Figure 5:
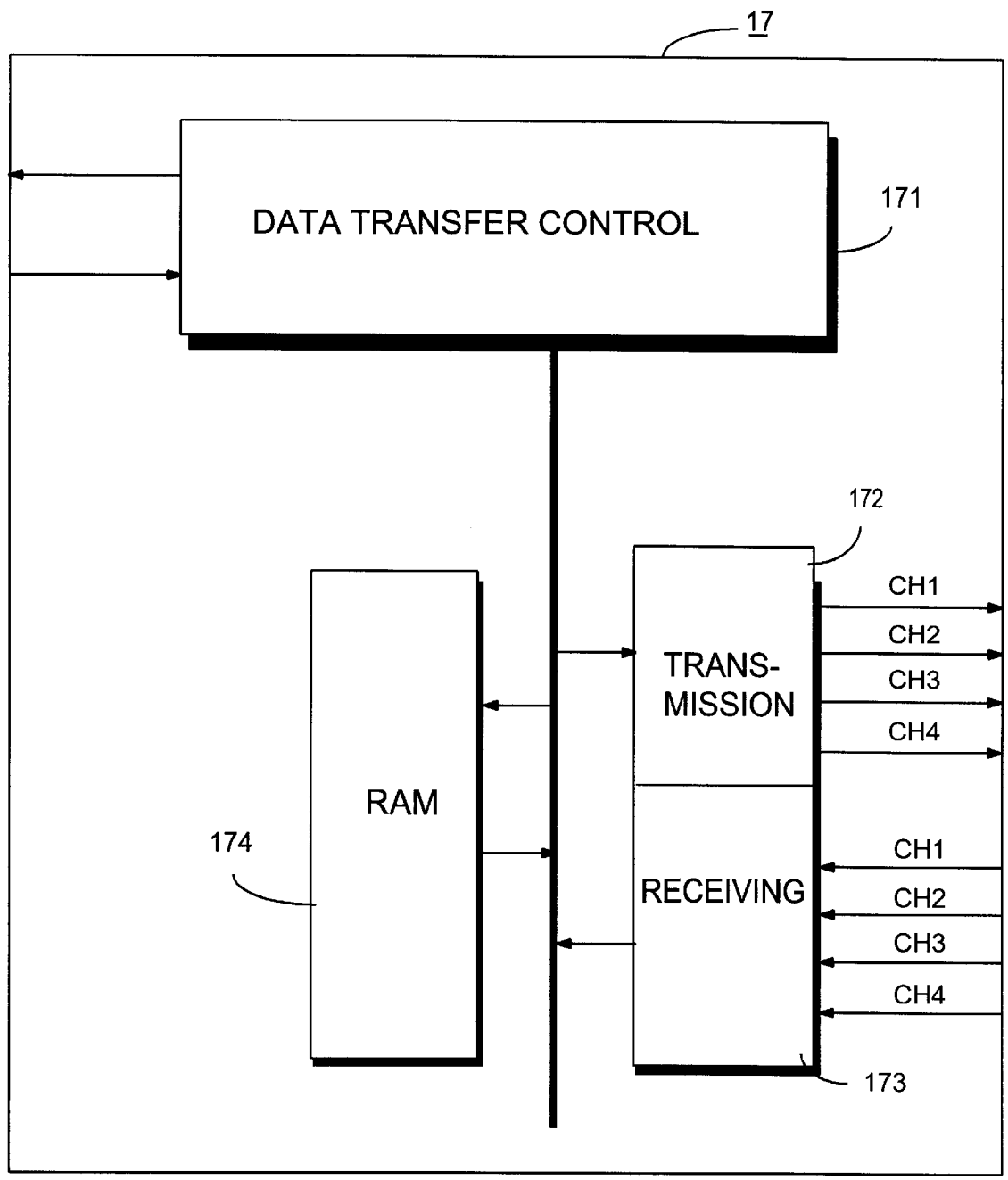
FIG. 5 is a block diagram showing in detail a controller control circuit in the FIG. 2 embodiment.

The controller control circuit 17 is provided for transmission and reception of data in serial between the bus control circuit 12, i.e., the RCP, and the connector 181–184, and includes as shown in FIG. 5 a data transfer control circuit 171, a signal transmitting circuit 172, a signal receiving circuit 173 and a RAM 174 for temporarily storing transmission and reception data. The data transfer control circuit 171 includes a parallel-serial conversion circuit and a serial-parallel conversion circuit for data format conversion during data transfer, and also controls write-in and read-out of the RAM 174. The serial-parallel conversion circuit converts serial data supplied from the bus control circuit 12 into parallel data to provide it to the RAM 174 or the signal transmitting circuit 172. The parallel-serial conversion circuit converts parallel data supplied from the RAM 174 or the signal receiving circuit 173 into serial data to provide to the bus control circuit 12. The signal transmission circuit 172 converts data for signal read-in control of the controller 40 supplied from the data transfer control circuit 171 and converts write-in data (parallel data) to the RAM cartridge 50 into serial data, which data is transmitted through a corresponding channel CH1–CH4 to each of the plurality of controllers 40. The signal receiving circuit 173 receives data in serial form representative of an operating state of each of the controllers 40 input through a corresponding channel CH1–CH4 and read-out data from the RAM cartridge 50, to convert such data into parallel data to provide to the data transfer control circuit 171.

Figure 6:
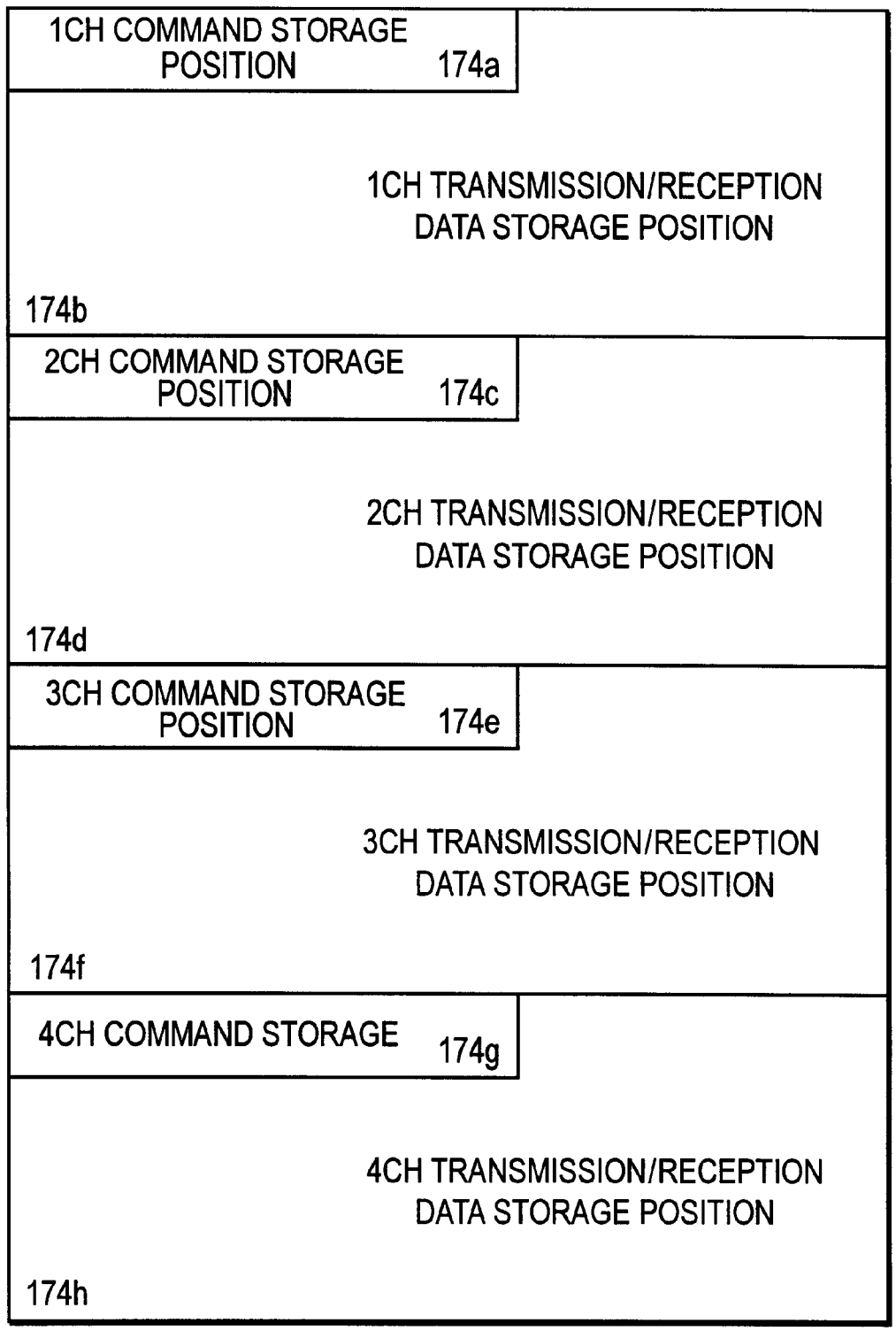
FIG. 6 is an illustrative view showing a memory map of a RAM in FIG. 5.

The RAM 174 of the controller control circuit 17 includes memory regions or memory areas 174a–174h as shown In a memory map of FIG. 6. Specifically, the area 174a stores a command for channel 1, while the area 174b stores transmission data and reception data for channel 1. The area 174c stores a command for channel 2, while the area 174d stores transmission data and reception data for channel 2. The area 174e stores a command for channel 3, while the area 174f stores transmission data and reception data for channel 3. The area 174g stores a command for channel 4, while the area 174h stores transmission data and reception data for channel 4.

Accordingly, the data transfer control circuit 171 operates to control writing to the RAM 174 data transferred from the bus control circuit 12 or data indicating the operating state of the controller 40 received by the signal receiving circuit 173. The data transfer control circuit 171 operates to control reading out of data from the RAM cartridge 50, and reading data out of the RAM 174 based on a command from the bus control circuit 12 to transfer such data to the bus control circuit 12.

An exemplary implementation of the FIG. 5 controller control circuit 17 is described in further detail in the above-identified incorporated application Ser. No. 08/562,288 (the peripheral interface or PIF therein).

Figure 7A:
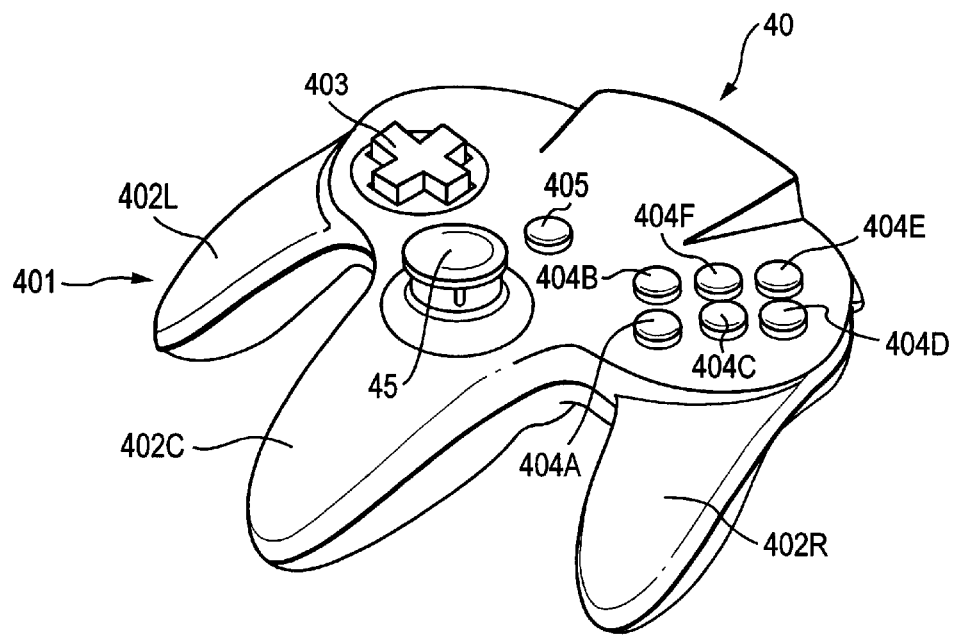
FIGS. 7A and 7B are perspective views of a controller in the FIG. 2 embodiment as viewed from the top and bottom.
Figure 7B:
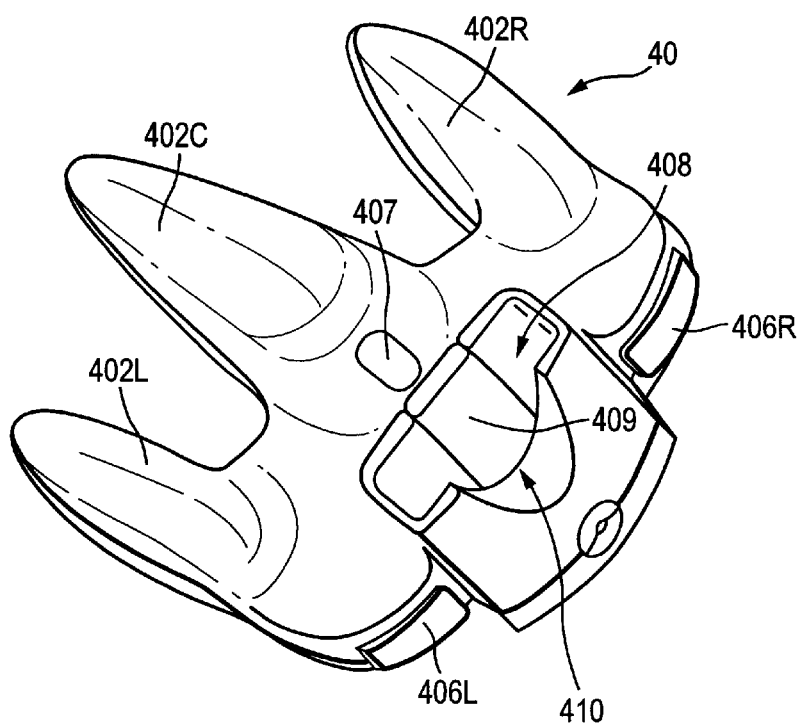

FIGS. 7A and 7B are external perspective views of front and back surfaces of a controller 40. The controller 40 is shaped such that it can be grasped by both hands or one hand, and has a housing having an exterior formed with a plurality of projecting buttons or control keys which, when depressed, generate an electric signal and a vertically-standing control member portion. Specifically, the controller 40 includes an upper housing and a lower housing. The housing of the controller 40 has an operating area formed on an upper surface in a planar shape extending sideways. The operating area of the controller 40 includes a cross-shaped digital direction switch (hereinafter referred to as "cross switch") 403 on a left side, a plurality of button switches (hereinafter referred to as "switches") 404A–404F on a right side, a start switch 405 generally at a laterally central portion, and a joystick 45 providing analog input at a centrally lower portion. The cross switch 403 is a direction switch for designating the direction of movement of a player controlled heroic character, e.g., Mario, or a cursor, which has upper, lower, left and right depression points used for designating movement in four directions. The switches 404A–404F, may have different functions as defined by game software and may be used, for example, to launch a missile in a shooting game, or designate various actions such as jumping, kicking, or controlling an action game in many different ways. The joystick 45 may be used in place of the cross switch 403 to designate the direction of movement of an object. It can designate direction over the entire angular range of 360 degrees, being utilized as an analog direction designating switch.

The housing of the controller 40 has three grips 402L, 402C and 402R formed in a manner projecting downward from three locations of the operating area. The grips 4024 402C and 402R are rod-shaped such that, when seized by the hand, they are contoured by the palm, the middle finger, the finger between the little and the middle fingers and the little finger. Each grip is formed by a relatively thin base portion, a thicker intermediate portion which thins toward an open end (downward in FIG. 7A). The bottom housing of the controller 40 has an insertion aperture 408 formed at a centrally upper portion which projects from the underside for detachably attaching a RAM cartridge 50 as an expansion device. The housing has a button switch 406L and a button 406R provided on left and right upper side faces thereof at locations corresponding to the positions to which the left and right index fingers of a player extend. On a back surface at the base portion of the central grip 402C, a switch 407 is provided as a switch having a function similar to the switch 406L when the joystick 45 is used in place of the cross switch 403 (or whose function may be varied in accordance with the game program).

The lower half of the housing on a back surface side extends toward a bottom surface to have the aperture 408 formed at a tip end thereof. At a deep end of the aperture 408, a connector (not shown) is provided to which an extension cartridge 50 is to be connected. In the aperture 408 a lever 409 is also formed for ejecting the cartridge 50 inserted in the aperture 408. On a side opposite to the lever 409 in the aperture 408 for insertion of an extension cartridge 50, a cut-out 410 is formed, which cut-out 410 provides a space for pulling out the extension cartridge 50 upon taking out the extension cartridge 50 by using the lever 409.

Figure 8:
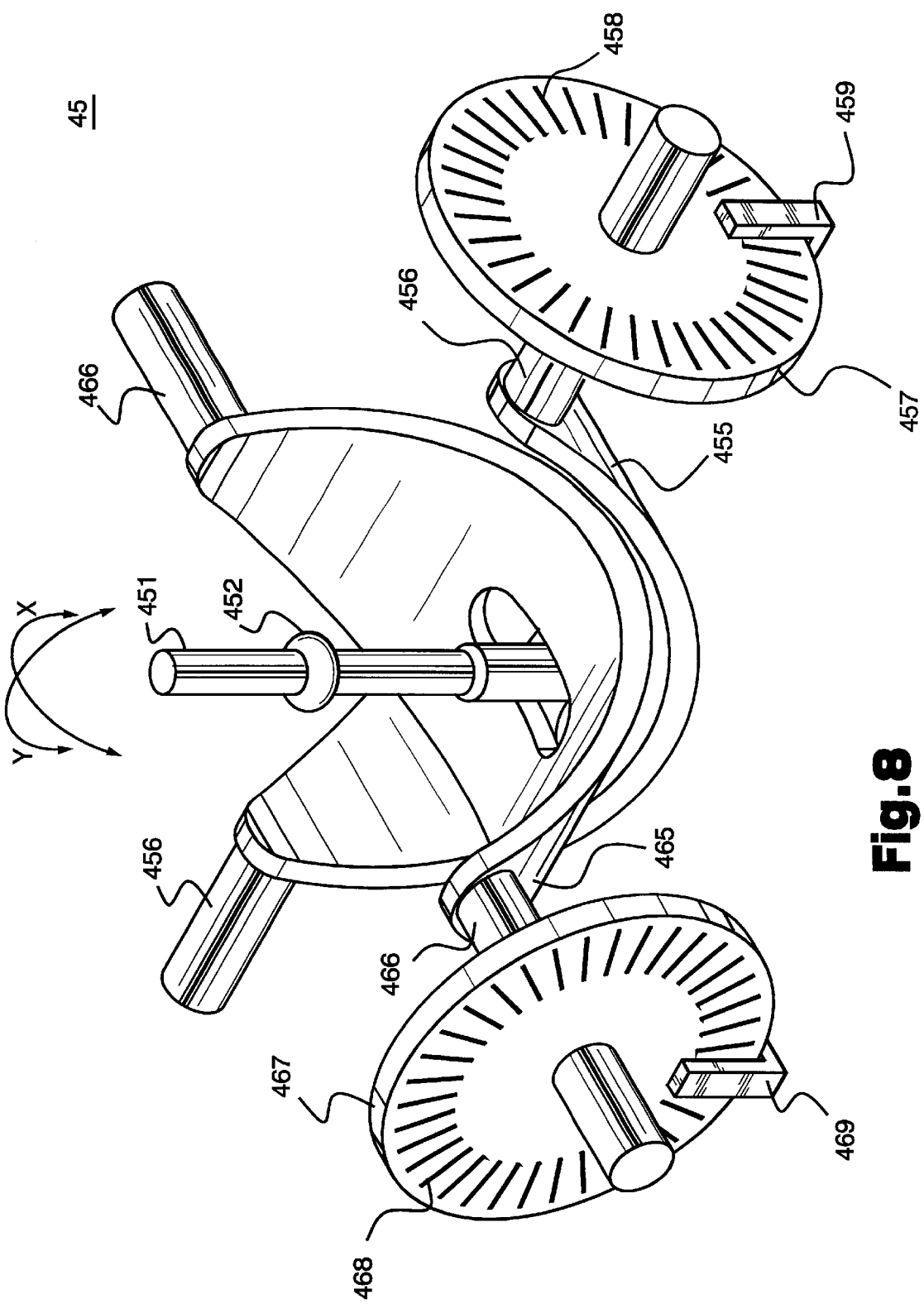
FIG. 8 is an exemplary internal joystick structure of the FIGS. 7A, B controller.

An exemplary internal construction of the controller 40 joystick 45 is shown in FIG. 8. The tip of the operation member 451 protruding from the housing is formed into a disk which is easily manipulated by placing one's finger on it. The part below the disk of the operation member 451 is rodshaped and stands vertically when it is not being manipulated. In addition, a support point 452 is situated on the operation member 451. This support point 452 securely supports the operation member on the controller 40 housing so that it can be tilted in all directions relative to a plane. An X-axis linkage member 455 rotates centered around an X shaft 456 coupled with tilting of the operation member 451 in the X-direction. The X shaft 456 is axially supported by a bearing (not shown). A Y-axis linkage member 465 rotates centered around a Y shaft 466 coupled with tilting of the operation member 451 in the Y-direction. The Y shaft 466 is axially supported by a bearing (not shown). Additionally, force is exerted on the operation member 451 by a return member, such as a spring (not shown), so that it normally stands upright. Now, the operation member 451, support 452, X-axis linkage member 455, X shaft 456, Y-axis linkage member 465 and Y shaft 466 are also described in Japan Utility Patent Early Disclosure (Kokai) No. HEI 2-68404.

A disk member 457 is attached to the X shaft 456 which rotates according to the rotation of the X shaft 456. The disk member 457 has several slits 458 around the perimeter of its side at a constant distance from the center. These slits 458 are holes which penetrate the disk member 457 and make it possible for light to pass through. A photo-interrupter 459 is mounted to the controller 40 housing around a portion of the edge of the perimeter of the disk member 457, which photo-interrupter 459 detects the slits 458 and outputs a detection signal. This enables the rotated condition of the disk member 457 to be detected. A description of the Y shaft 466, disk member 467 and slits 468 are omitted since they are the same as the X shaft 456, disk member 457 and slits 458 described above.

The technique of detecting the rotation of the disc members 457 and 467 using light, which was described above, is disclosed in detail in Japan Patent Application Publication No. HEI 6-114683, filed by applicants' assignee in this matter, which is incorporated herein by reference.

In this exemplary implementation, disk member 457 is directly mounted on the X-axis linkage, member 455, but a gear could be attached to the X shaft 456 and the disc member 457 rotated by this gear. In such a case, it is possible to cause the disc member 457 to greatly rotate by the operator slightly tilting the operation member 451 by setting the gear ratio so that rotation of the disc member 457 is greater than rotation of the X shaft 456. This would make possible more accurate detection of the tilted condition of the operation member 451 since more of the slits 458 could be detected. For further details of the controller 40 joystick linkage elements, slit disks, optical sensors and other elements, reference is made to Japanese Application No. H7-317230 filed Nov. 10, 1995, which application is incorporated herein by reference.

Additionally, in the exemplary embodiment, a method for detecting the rotation of the disc members 457 and 467 is disclosed which detects the slits 458 and 468 using photo-interrupters 459 and 469, but any method could be used in conjunction with this exemplary embodiment as long as it detects rotation of the disc members 457 and 467. For example, a method of detecting the disk members 457 and 467 rotation could be used in which several conductor members are situated on the disc members 457 and 467 and these conductor members are then electrically detected.

Figure 9:
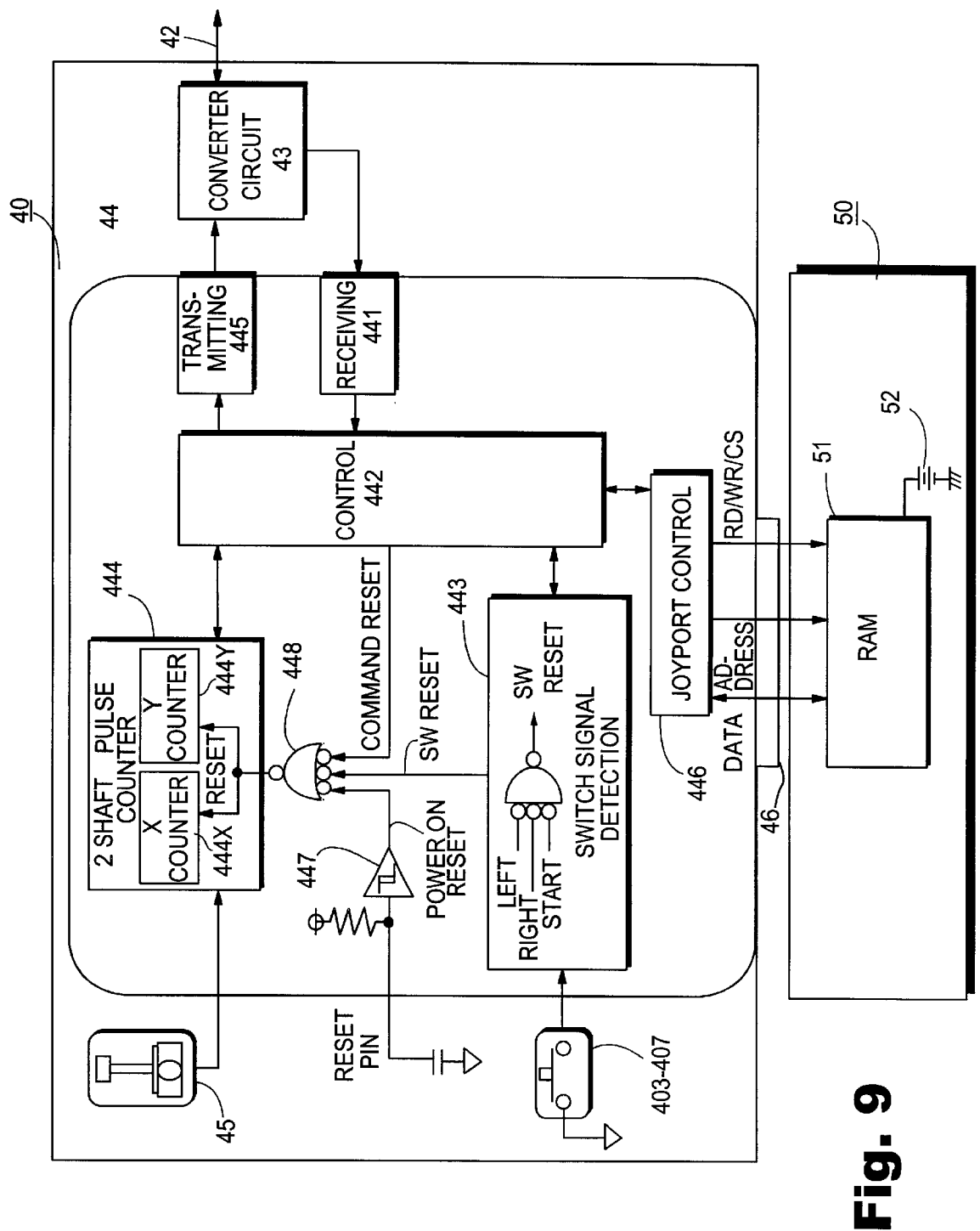
FIG. 9 is a block diagram showing in detail the controller and an extension device.

FIG. 9 is a detailed circuit diagram of a controller 40 and a RAM cartridge 50 shown as one example of an extension or expansion device. The controller 40 incorporates within its housing electronic circuits such as operation signal processing circuit 44, etc. in order to detect operating states of the switches 403–407 or the joystick 45 or the like and transfer detected data to the controller control circuit 17. The operation signal processing circuit 44 includes a signal receiving circuit 441, a control circuit 442, a switch signal detecting circuit 443, a counter circuit 444, a signal transmitting circuit 445, a joyport control circuit 446, a reset circuit 447 and a NOR gate 448.

The signal receiving circuit 441 converts a serial signal, such as a control signal transmitted from the controller control circuit 17, or write-in data to the RAM cartridge 50, etc., into a parallel signal to supply it to the control circuit 442. The control circuit 442 generates a reset signal to cause resetting (0) of measured values of an X-axis counter 444X and a Y-axis counter 444Y included in the counter 444, when the control signal transmitted from the controller control circuit 17 Is a reset signal for an X, Y coordinate of the joystick 45. The joystick 45 includes photo-interrupters for the X-axis and the Y-axis to generate a number of pulses proportional to the amount of inclination of a lever in directions of the X-axis and Y-axis, providing respective pulse signals to the counters 44X and 444Y. The counter 444X, when the joystick 45 is inclined in the X-axis direction, measures the number of pulses generated in proportion to the amount of inclination. The counter 444Y measures the number of pulses generated in proportion to the amount of Inclination, when the joystick 45 is inclined in the Y-axis direction. Accordingly, the resultant vector, determined by the measured values in X-axis and Y-axis of the counter 444X and the 444Y, determines the moving direction and the moving speed for the displayed player controlled object or the cursor.

The counter 444X and the counter 444Y are also reset of their measured values by a reset signal supplied from the reset signal generating circuit 447 upon turning on the power supply, or a reset signal supplied from the switch signal detecting circuit 443 when the player simultaneously depresses two switches.

The switch signal detecting circuit 443 responds to an output command signal representing a switch state supplied at a constant period (e.g., at a 1/30-second interval in a frame period of a television), and reads a signal that is varied by the state of depression of the cross switch 403 and the switches 404A–404F, 405, 4061, 406R and 407 to supply it to the control circuit 442.

The control circuit 442 responds to a read-out command signal of operating state data from the controller control circuit 17, and supplies the operating state data of the switches 403–407 and the measured values of the counters 444X, 444Y to the signal transmitting circuit 445 in a predetermined data-format order. The signal transmitting circuit 445 converts these parallel signals output from the control circuit 442 into serial data to transfer them to the controller control circuit 17 via a conversion circuit 43 and a signal line 42.

To the control circuit 442 are connected an address bus, a data bus, and a port control circuit 446 through a port connector 40. The port control circuit 446 performs input-output control (or signal transmission or reception control) on data according to commands from the CPU 11, when the RAM cartridge 50, which is one example of an extension device, is connected to a port connector 46. The RAM cartridge 50 includes a RAM 51 which is connected to the address bus and the data bus, and which includes a battery 52 for supplying power source to the RAM 51. The RAM cartridge 50 may also include a timer chip (not shown) as one example of a time-related information generating means (or a calendar timer) connected to the address bus and the data bus. The battery 52 would be connected for supplying power to the RAM 51 and the timer chip (which may be a conventional timer counting circuit), and also a decoder (not shown) for activating the timer counter when a predetermined address is given. The RAM 51, may, for example, be a RAM that has a capacity lower than a half of a maximum memory capacity accessible by using an address bus, and may, for example, be a 256 k-bit RAM. The lower capacity may be used to avoid duplication between the write-in/read-out address of the RAM and the read-out address of the timer chip by reading out a value of an arbitrary counter within the timer chip 53 when the highest order bit becomes "1". The RAM 51 stores backup data associated with a game, so that, if the RAM cartridge 50 is removed from the port connector 46, the stored data is maintained by receiving power supply from the battery 52.

FIG. 10 is a graphical illustration of a data format by which the image processing apparatus reads out data representative of an operating state of switches 403–407 and joystick 45 from the controller 40. The data generated by the controller 40 is configured as 4-byte data, The first-byte B, A, G, START, upper, lower, left and right, i.e., represents the state of switches 404B, 404A, 407, 405 and the four cross switch 403 directions. For example, when the button B, i.e., the switch 404B, is depressed, the highest order bit of the first byte becomes "1". Similarly, the second-byte represents JSRST, 0 (not employed in the exemplary embodiment), L, R, E, D, C and F, i.e., the state of the switches 409, 406L, 406R, 404E, 404D, 404C and 404F. The third byte represents by binary digits the X coordinate value (the value measured by the X counter 444X) which value depends upon the inclination angle of the joystick 45 in the X direction. The fourth byte represents by binary digits the Y coordinate value (the value measured by the Y counter 444Y) which value depends upon the inclination angle of the joystick 45 in the Y direction. Because the X and Y coordinate values are expressed by 8 bits of binary digits, the conversion into decimal digits makes it possible to represent the inclination of the joystick 45 by a numeral from 0–255. If the highest order bit is expressed by a signal denoting a negative value, the inclination angle of the joystick 45 can be expressed by a numeral between −128 and 127. In the exemplary embodiment, this controller data is received by the image processing apparatus under the control of various commands which are described generally below and are exchanged between the controllers 40 and the image processing system 10. For further details concerning the exchange of data and commands between the controllers 40 and the image processing system 10, reference is made to the incorporated by reference '288 and '019 applications.

An explanation of the transmission and reception of data between the image processing apparatus 10 and the controller 40, as well as the operation of object movement control according to the data from the controller 40 is set forth below. Referring first to a FIG. 11 flowchart for the CPU 11 of the image processing apparatus 10, an explanation is made concerning image processing. At a step S11, CPU 11 is initialized based on an initial value stored in the program data area 202 in FIG. 4. At the step S11, the CPU 11 set for example to the initial value of the moving speed of the object in the program data region 142 (FIG. 4) of the RAM 14. Then, at a step S12, CPU 11 outputs a control pad data request command (shown in the incorporated '288 and '019 applications) stored in the program data area 202 to the RCP (the bus control circuit 12). Accordingly, at the step S12, the CPU 11 receives commands (as shown in the '288 and '019 applications) at that time to store them to command accommodating storage sites 174a–174d for respective channels. At this time, the count values of the X counter 444X and the Y counter 444Y are provided to the CPU 11 as XY coordinate data.

Then at a step S12a the CPU 11 execute processes to alter the position of the object in accordance with joystick data from the controller 40 which has been stored in the command accommodating sites 174a–174d for the channels (FIG. 6). Note that the step S12a is explained in detail below with reference to FIG. 14.

At a step S13, the CPU It carries out predetermined desired image processing based on the program stored in the program data area 202 and the image data area 201. While the CPU 11 is executing the step S13, the RCP (bus control circuit 12) is executing steps S21–S24 shown in FIG. 12. Then, at step S14, the CPU 11 outputs image data based on the control pad data stored in the control pad data area 141 in FIG. 4. After completing step S14, the CPU 11 repeats the execution of steps S12–S14.

Figure 12:
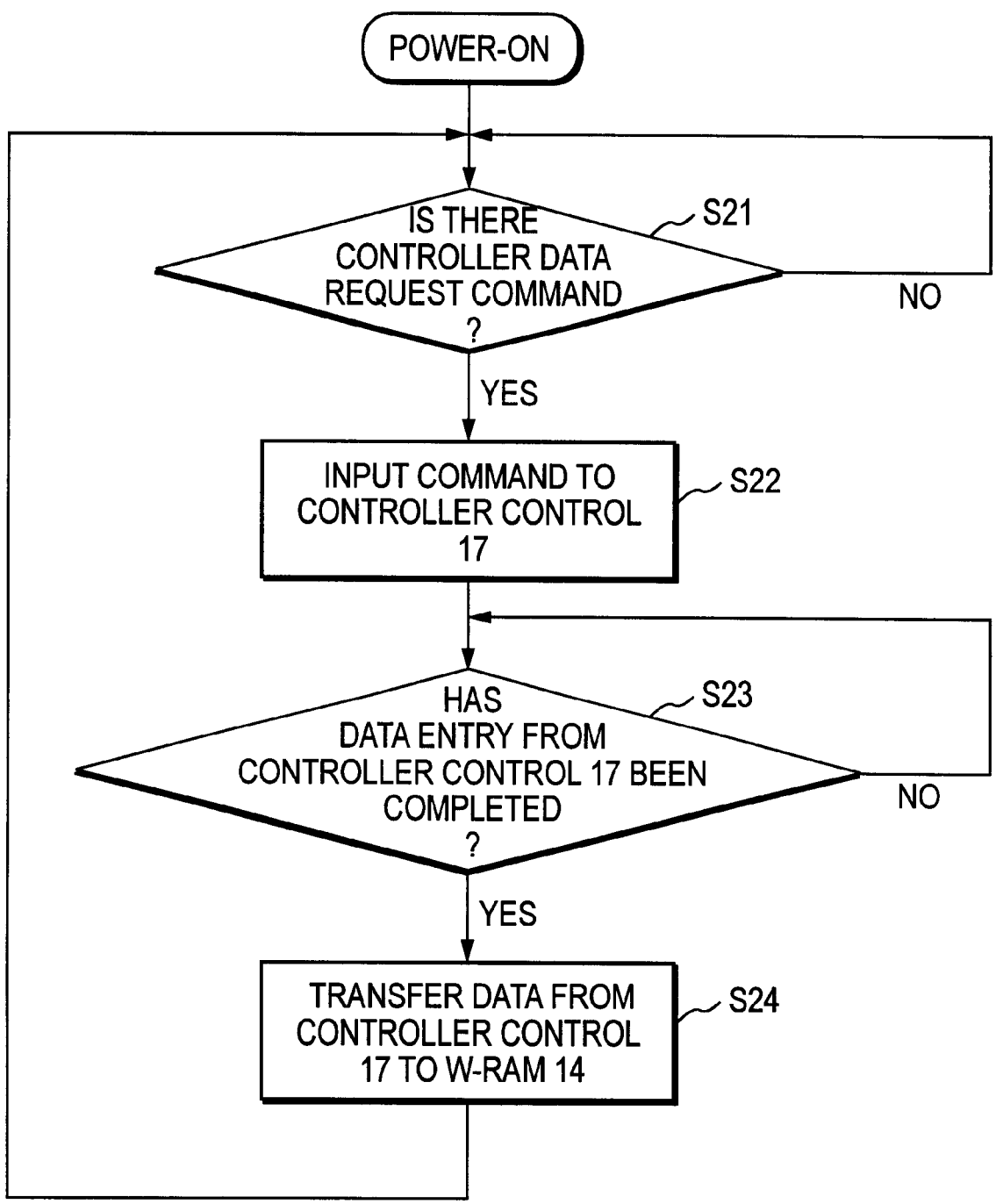
FIG. 12 is a flowchart showing the operation of the bus control circuit in the FIG. 2 embodiment, i.e., an RCP (Reality Co-Processor) in FIG. 3.

The operation of the RCP (the bus control circuit 12) is explained in conjunction with FIG. 12. At a step S21, the bus control circuit 12 determines whether or not the CPU 11 has output a controller data request command (a request command for data relating to the switches of the controller 40 or data relating to the expansion device 50). If a controller data request command has not been output, the RCP waits until one is output. If a controller data request command has been output, the process proceeds to a step S22. At step S22, the bus control circuit 12 outputs a command for reading in controller 40 data to the controller control circuit 17. Then, at a step S23, the bus control circuit 12 determines whether or not the controller control circuit 17 has received data from the controller 40 to store it in the RAM 174. If the controller control circuit 17 has not received data from the controller 40 to store in the RAM 174, the bus control circuit 12 waits at step S23. The controller control circuit 17 has received data from the controller 40 to store in the RAM 174, the process proceeds to a step S24. At step S24, the bus control circuit 12 transfers the data of the controller 40 stored in the RAM 174 to the RAM 14. The bus control circuit 12, when completing the data transfer to the RAM 14, returns back to step S21 to repeat execution of steps S21—the step S24.

Figure 11:
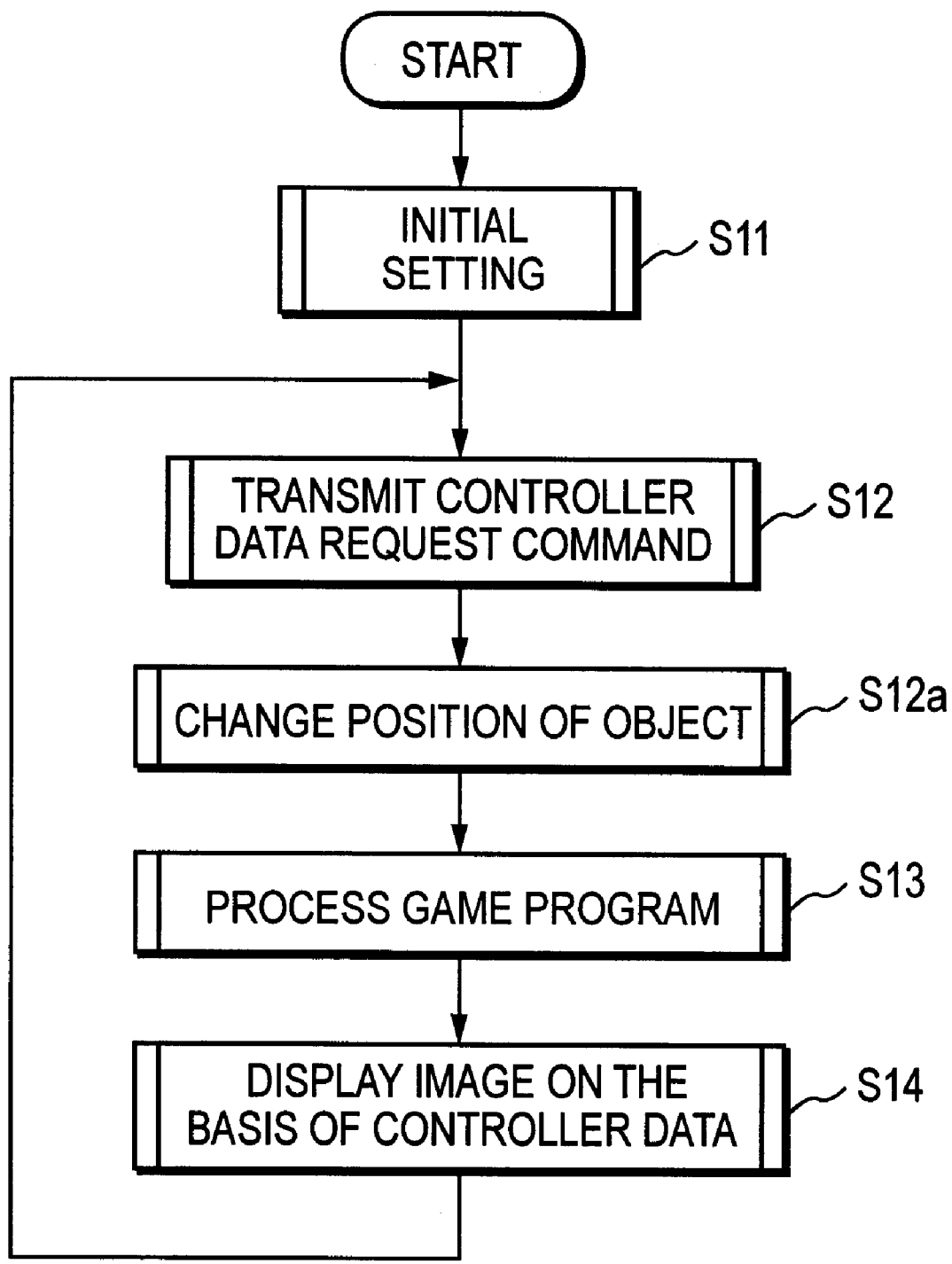
FIG. 11 is a flowchart showing the operation of a CPU in the FIG. 2 embodiment.

The FIG. 11 and FIG. 12 flowcharts show the example wherein, after the bus control circuit 12 has transferred data from the RAM 174 to the RAM 14, the CPU 11 processes the data stored in the RAM 14. However, the CPU 11 may directly process the data in the 174 through the bus control circuit 12.

Figure 13:
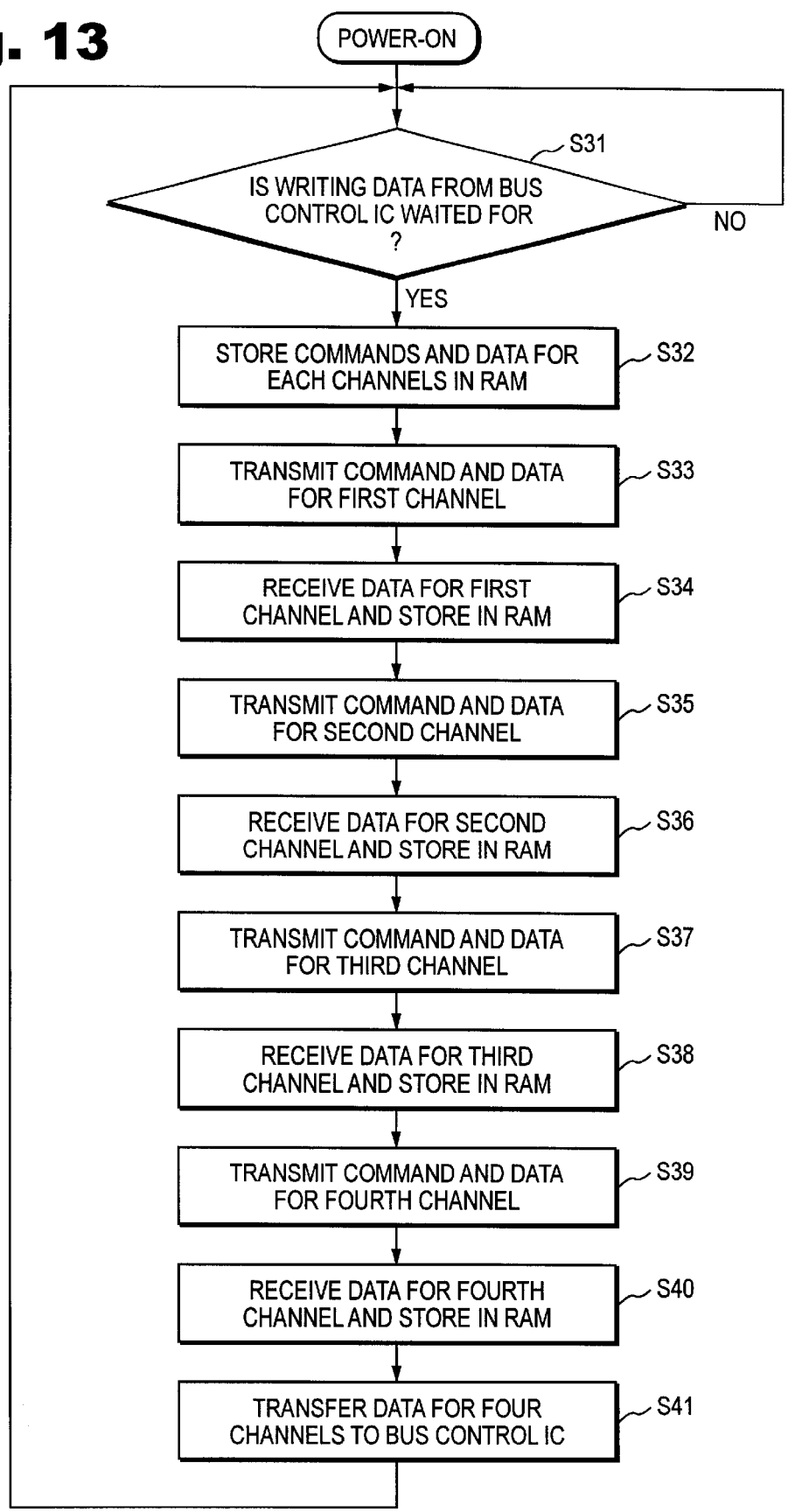
FIG. 13 is a flowchart showing the operation of the controller control circuit in the FIG. 2 embodiment.

FIG. 13 is a flowchart for explaining the operation of the controller control circuit 17. At a step S31, it is determined whether there is a write wait from bus control circuit 12. If there is not a write wait, the data transfer control circuit 171 waits until there is a write wait from the bus control circuit 12. If there is a write wait, at a next step S32 the data transfer control circuit 171 causes the RAM 174 to store commands for the first to the fourth channels and/or data (hereinafter abbreviated as "command/data"). At a step S33, the command/data for the first channel is transmitted to the controller 40 connected to the connector 181. The control circuit 442 performs a predetermined operation based on the command/data to output data to be transmitted to the image processing apparatus 10. The content of the data is described below in explaining the operation of the control circuit 442. At step S34, the data transfer control circuit 171 receives data output from the control circuit 442 to cause the RAM to store the data.

At step S35, the command/data for the second channel is transmitted to the controller 40, in a manner similar to the operation for the first channel at the step S33. The control circuit 442 performs a predetermined operation based on this command/data to output the data to be transmitted to the image processing apparatus 10. At a step S36 data transfer and write-in processes are carried out for the second channel. Meanwhile, at a step S37, the command/data for the third channel is transmitted to the controller 40. The control circuit 442 performs a predetermined operation based on this command/data to output the data to be transmitted to the image processing apparatus 10. At step S38 data transfer and write-in processes are carried out for the third channel. Furthermore, at a step S39, the command/data for the fourth channel is transmitted to the controller 40. The control circuit 442 of the controller 40 performs a predetermined operation based on this command/data to output the data to be transmitted to the Image processing apparatus 10. At step S40 data transfer and write-in processes are carried out for the fourth channel. At a subsequent step S41, the data transfer circuit 171 transfers in batch the data which it received at steps S34, S36, S38 and S40 to the bus control circuit 12.

In the above-identified manner as stated above, the data for the first channel to the fourth channel that is, the commands for the controllers 40 connected to the connectors 181–184 and the operating state data to be read out of the controllers 40, are transferred by time-divisional processing between the data transfer control circuit 171 and the control circuit 442 respectively within the controllers 40.

For further details concerning the exchange of data between the controllers 40 and the image processing system 10, the associated commands, and further peripheral subsystem hardware and software details, reference is made to the incorporated by reference '288 and '019 applications.

Figure 14:
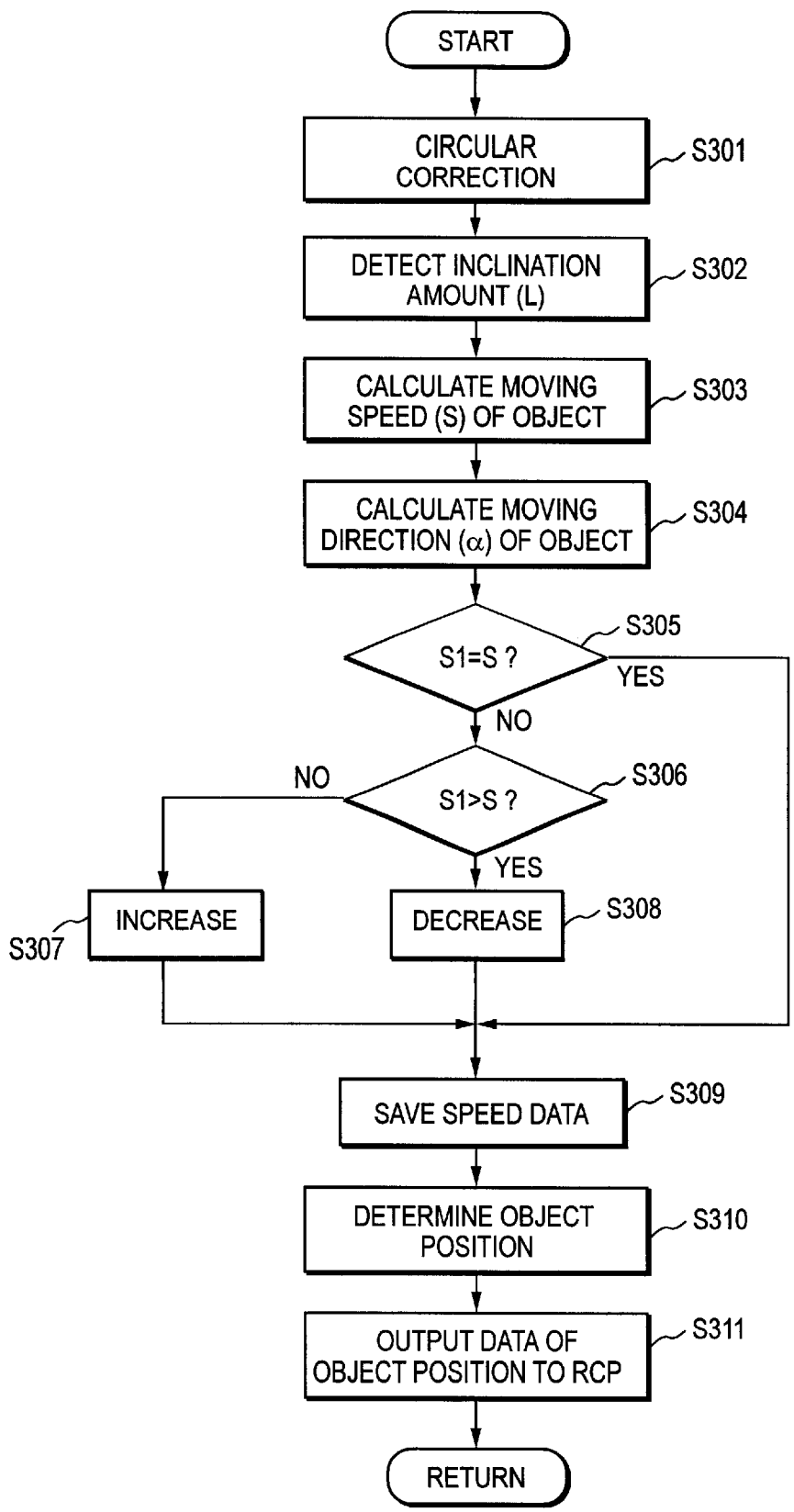
FIG. 14 is a flowchart showing a subroutine for varying the position of the object in the FIG. 2 embodiment.

With reference to FIG. 14, the object position modifying step S12a in FIG. 11 is explained in detail. At a first step S301 in FIG. 14, the CPU 11 corrects the joystick data, i.e., the X coordinate data and the Y coordinate data from the controller 40. The joystick 45 (FIG. 7A) has a structure that can be inclined within an octagonal range 451 in a plane as shown FIG. 15. Accordingly at step S301, the data within the octagonal range of inclination is converted or corrected into data within a circular range 452. There is no necessity of executing the correcting step. That is, the subsequent steps may be executed with the octagonal inclination range data.

Figure 15:
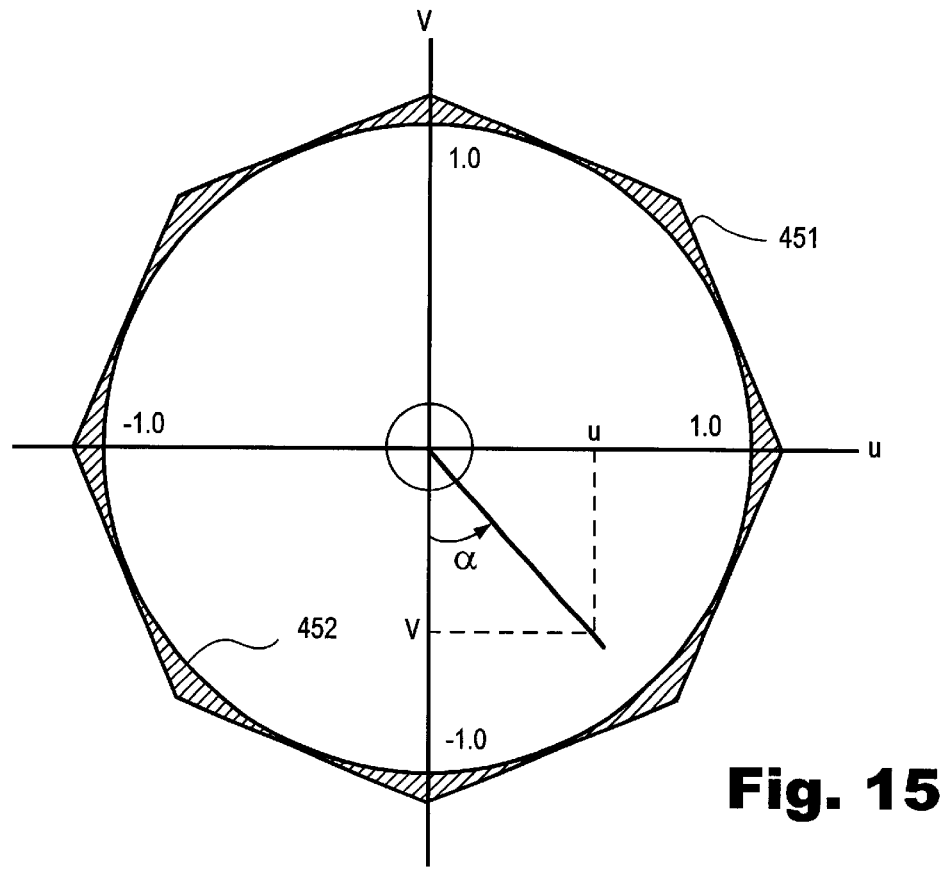
FIG. 15 is an illustrative view showing the relation between the inclinable range of the analog joystick and the circular correction therefore.
Figure 16:
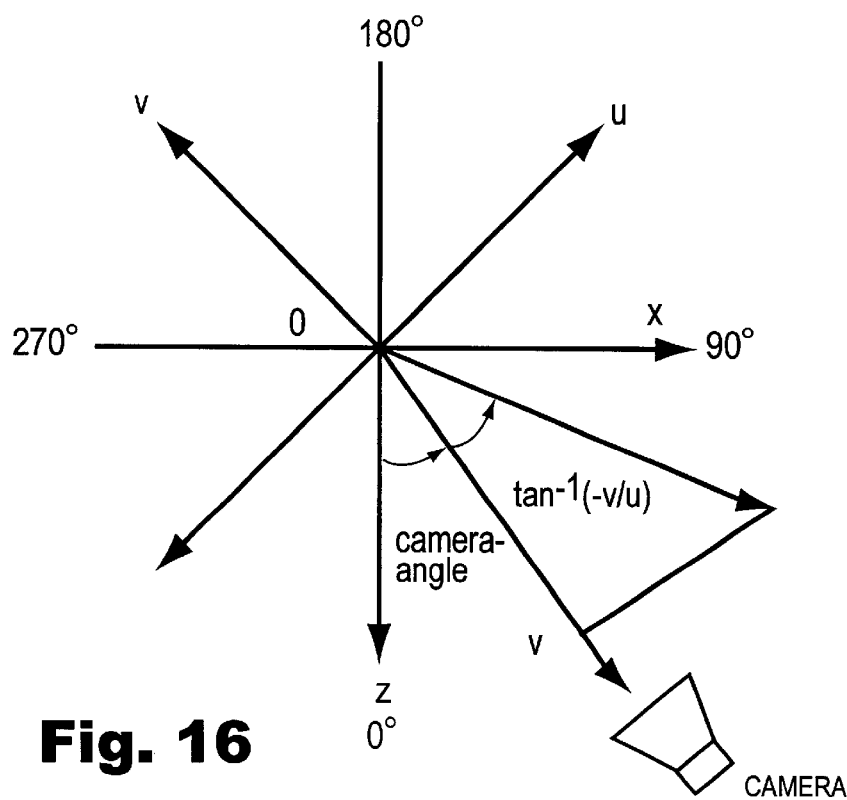
FIG. 16 is an illustrative view showing the moving direction of the object.

At step S301, the XY coordinate data for the joystick 45 is converted into coordinate data (u, v) in an UV plane as shown in FIG. 15. On this occasion, the maximum amount of inclination of the joystick 45 is normalized to "1". That is, the joystick 45 in the UV plane in FIG. 15 is allowed to incline within respective ranges of $-1.0 \leq u \leq 1.0$ and $-1.0 \leq v \leq 1.0$. This is because, since a square curve is utilized to calculate the moving speed S of the object as stated later, a low speed range thereof is to be extended. By doing so, it becomes possible to move the object at a considerably slow speed.

At subsequent steps S302, S303 and S304, the CPU 11 calculates or detects the amount of inclination L of the joystick 45, the moving speed S of the object and the moving direction α thereof according to following Equations (1), (2) and (3), based on the corrected joystick data (u, v), $$L = \text{the square root of } "u^2+v^2" \quad (1)$$

$$S = L^2 \times \text{max-speed} \quad (2)$$

$$\alpha = \tan^{-1}(u/-v) + \text{camera-angle} \quad (3)$$

where, L: is the inclination amount of the joystick, u, v: is the inclination amount in each axis (coordinate positions), S: is the moving speed of the object, where the max-speed: selfrunning maximum speed (e.g., 32 cm/frame), α: is the direction of object movement. Equation (3) means that in a three-dimensional space the direction α of object movement is determined by the relative relations between the direction of joystick 45 inclination and the point of view perspective (camera-angle).

After calculating respectively at the steps S302, S303 and S304 the inclination amount L of the joystick, the moving speed S of the object and the moving direction α angle of a camera thereof in accordance with Equations (1), (2) and (3), the CPU 11 at a step S305 compares the actual moving speed S1 of the object in the previous frame stored at the speed data region 142 of the RAM 14 with the speed S calculated at step S303, determining whether they are equal to or not. If they are not coincident (S1 is not=to S), the CPU 11 determines whether S1>S at a next step S306.

If the determination is "No" at step S306, the process of acceleration is executed at a step S307, while if "Yes" is determined, the process of deceleration is executed at a step S308. In the acceleration process at step S307, a predetermined acceleration A is added to the actual moving speed S1 in the previous frame according to Equation (4). Note that the acceleration A is provided as one example by following Equation (5):

$$S = S1 + A \quad (4)$$

$$A \ 1.1 - S1/43.0 \quad (5)$$

Also, in the deceleration process at step S308, a predetermined deceleration B is subtracted from the actual moving speed S1 in the previous frame according to Equation (6). Note that the deceleration B is provided as one example by following Equation (7):

$$S = S1 - B \quad (6)$$

$$B = 2.0 \quad (7)$$

The reason for determining in Equation (5) the acceleration A based on the speed SI in the previous frame is to avoid abrupt changes of speed. Although in Equation (7) the deceleration B was set as a constant, it may alternatively be set as a function of moving speed S1 in the previous frame in a manner similar to the acceleration A. Furthermore, the acceleration A may be a constant value.

If "Yes" is determined at the step S305, the process proceeds to a step S309 as is the case when executing steps S307 or S308. At step S309, either of the moving speed S determined at the step S307 or the moving speed determined at step S308 is written in the speed data region 142 of the RAM 14, thereby updating the speed data.

At a next step S310, the position x and z of the object is calculated according to following Equations (8) and (9), based on the moving speed thus determined. That is, the position of the object is determined by the vector amount S and the vector angle α.

$$x = x + S \times \sin \alpha \quad (8)$$

$$z = z + S \times \cos \alpha \quad (9)$$

At a step S311, the CPU 11 outputs the position data determined by Equations (8) and (9) to the bus control circuit, or the RCP, 12. In response, the RCP 12 executes signal processing and image processing in dependence upon the object position data given thereto, and outputs image data through the I/O control 12 to the D/A converter 16.

In this manner, the moving direction and the moving amount (moving speed) of the object are determined in the above example based on the inclination amount data for the controller 40 joystick, thereby varying the position of the object in the three-dimensional space. In other words, the object is displayed at a position thus varied In the next frame on the display 32 (monitor 30).

In addition to the character control techniques described above, the present invention also contemplates the use of the additional character control and animation features and the automatic and user controlled camera modes, which are explained in detail in a provisional application filed on Apr. 9, 1997, entitled "Video Game System and Method With Enhanced Three-Dimensional Character and Background Control" naming Miyamoto et al as inventors, which application is incorporated herein by reference.

Figure 17:
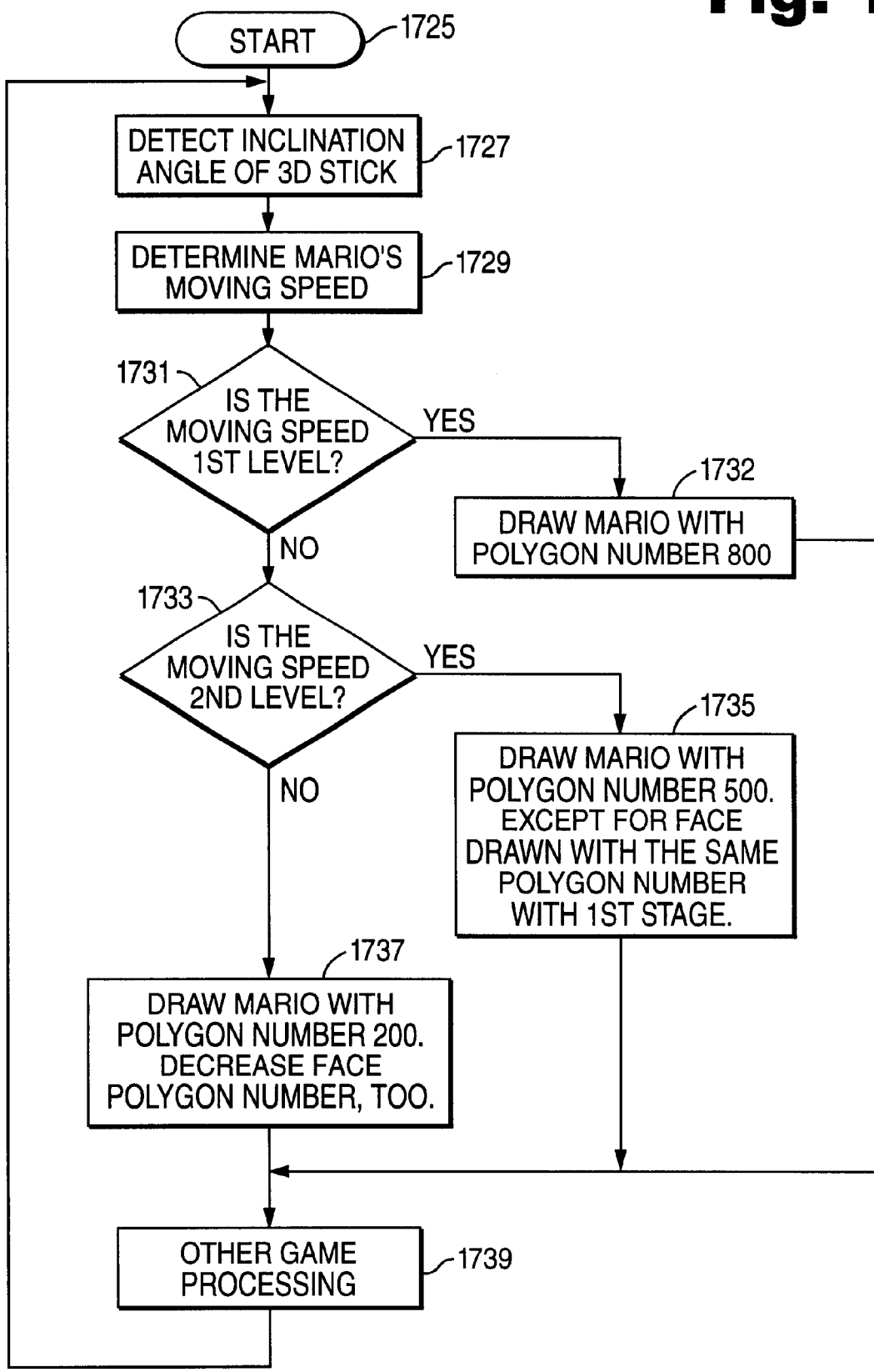
FIG. 17 is a flowchart explaining how a character's polygon number is dynamically changed.

In accordance with one exemplary embodiment of the video game methodology of the present invention, the number of polygons which are utilized to form a moving object character, such as Mario, is controlled as a function of character speed. In accordance with this embodiment, in addition to conventional level of detail processing (where the number of polygons utilized to form a character is reduced as the character travels further and further from the line of sight), the method described in FIG. 17 provides a mechanism for reducing the burden on the polygon generating subsystem when Mario is controlled to rapidly move around the screen. The method described in FIG. 17 is designed to reduce the likelihood that the user will notice the reduction in the number of polygons. It is premised in part on the user paying more attention to the face and head than the body of the character.

Turning to FIG. 17, after the game program is started and initial processing is completed, game play begins and the program detects the inclination angle of the joystick (1725, 1727). As previously described, based upon the angle of inclination of the joystick, the character speed is determined (1729). A check is then made at block 1731 to determine whether the characters speed is at a first level, which indicates either no motion or travelling at a slow speed. If Mario is moving at a predetermined first slow speed, Mario is drawn with a predetermined number of polygons, e.g., 800 (1732), and other game processing continues as the routine branches to block 1739. Accordingly, the character is drawn at a high resolution at such slow speeds.

If the character is moving at a speed higher than the predetermined first level, then a check is made at 1733 to determine whether the speed of Mario is moving at a predetermined, but moderate, higher level of speed. If Mario is moving at the predetermined higher second level speed, then the character is drawn with a reduced polygon number, e.g., 500, but the face is drawn with the same number of polygons as was utilized to draw the character when movement was detected as static or the first level speed. If the character speed is detected to be higher than the moderate, predetermined second level speed, then the character is drawn with 200 polygons and the number of polygons utilized to draw the face is reduced as well (1737). After the character is drawn at either blocks 1732, 1735 or 1737 other game processing continues (1739) and the routine branches back to the detecting the inclination of the joystick step (1727).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. For use with a video game system console having a game program executing processing system to execute said video game program to create a display simulating a player controlled character in a three-dimensional world, and at least one player controller having a operation control member and a plurality of control keys and operable by a player to generate video game control signals, a portable storage device for controlling the operation of said video game system console comprising:

a memory media for storing video game instructions and graphics data;

a connector for coupling said video game instructions and said graphics data retrieved from said memory media to said video game system console;

said video game instructions including instructions for causing said game program executing processing system to display a player-controlled character and to detect the speed of the character's movement and in response to the detected speed to generate the character display with one of a first predetermined number of polygons and a second predetermined number of polygons, wherein an overall image of said character remains substantially the same regardless of the speed of said character's movement.

2. A portable storage device according to claim 1, wherein said character is displayed with a first predetermined number of polygons which is greater than said second predetermined number of polygons, if said speed of the character's movement is below a predetermined speed.

3. A portable storage device according to claim 1, wherein said character is displayed with a second predetermined number of polygons which is less than said first predetermined number of polygons, if said speed of the character's movement is above a predetermined speed.

4. A portable storage device according to claim 1, wherein the character's face is not drawn with a substantially reduced number of polygons when either said first or second predetermined number of polygons is used to draw the character.

5. A portable storage device according to claim 1, further including instructions for for causing said game program executing processing system to generate said character with a third predetermined number of polygons if the character's speed is detected as exceeding a predetermined high moving speed.

6. In an image processing system having an image processing program executing system to create a display simulating a character in a three-dimensional world, and at least one operation controller having a operation control member and a plurality of control keys and, a portable storage device for storing a program for controlling the operation of said image processing system comprising the steps of:

detecting when the character is moving in the three-dimensional world at no faster than a first predetermined speed;

displaying said character with a first predetermined number of polygons;

detecting when the character is moving in the three-dimensional world at no faster than a second predetermined speed which is higher than said first predetermined speed; and displaying said character with a second predetermined number of polygons which is less than said first predetermined number, wherein the displaying of said character with said second predetermined number of polygons provides an overall image of said character which is substantially the same as an overall image of said character displayed with said first predetermined number of polygons.

7. A method according to claim 6, wherein said step of displaying said character with a second predetermined number of polygons includes the step of decreasing the number of polygons used to generate the body of the character.

8. A method according to claim 6, wherein said step of displaying said character with a second predetermined number of polygons is performed without reducing the number of polygons used to generate the character's face.

9. A method according to claim according to claim 6, further including the steps of:

detecting when the character is moving in the three-dimensional world in excess of said second predetermined speed; and displaying said character with a third predetermined number of polygons which is less than said second predetermined number.

10. A method according to claim according to claim 6, wherein said image processing system is a video game system.

11. A method according to claim according to claim 6, wherein said image processing system is a video game system including a player controlling having a joystick, and wherein said steps of detecting each include the step of monitoring the angular rotation of said joystick.

12. For use with a video game system console having a game program executing processing system to execute said video game program to create a display simulating a player controlled character in a three-dimensional world, and at least one player controller having a operation control member and a plurality of control keys and operable by a player to generate video game control signals, a portable storage device for controlling the operation of said video game system console comprising:

a memory media for storing video game instructions and graphics data;

a connector for coupling said video game instructions and said graphics data retrieved from said memory media to said video game system console;

said video game instructions including instructions for causing said game program executing processing system to display an image of a player-controlled character and to detect the speed of the character's movement and in response to the detected speed to generate the character display with one of a first predetermined number of polygons and a second predetermined number of polygons, wherein said image remains substantially the same except for the complexity and detail thereof regardless of the number of polygons used for the display thereof.

13. In an image processing system having an image processing program executing system to create a display simulating a character in a three-dimensional world, and at least one operation controller having a operation control member and a plurality of control keys and, a portable storage device for storing a program for controlling the operation of said image processing system comprising the steps of:

detecting when the character is moving in the three-dimensional world at no faster than a first predetermined speed;

displaying said character with a first predetermined number of polygons to produce a first image of said character;

detecting when the character is moving in the three-dimensional world at no faster than a second predetermined speed which is higher than said first predetermined speed; and displaying said character with a second predetermined number of polygons which is less than said first predetermined number to produce a second image of said character;

wherein said first image of said character is substantially the same as said second image except for the complexity and detail thereof.

* * * * *